(12) United States Patent  (10) Patent No.: US 8,296,266 B2
Lehmann et al.  (45) Date of Patent: Oct. 23, 2012

(54) COMPUTER IMPLEMENTED METHOD FOR INTEGRATING SERVICES IN A CALENDAR APPLICATION VIA WEB SERVICES

(75) Inventors: Jens Lehmann, Wiesloch (DE); David Sommer, Bruehl (DE)

(73) Assignee: SAP AG, Walldorf (DE)

( * ) Notice: Subject to any disclaimer, the term of this patent is extended or adjusted under 35 U.S.C. 154(b) by 299 days.

(21) Appl. No.: 12/631,371

(22) Filed: Dec. 4, 2009

(65) Prior Publication Data

US 2011/0137929 A1  Jun. 9, 2011

(51) Int. Cl.
*G06F 7/00*  (2006.01)
(52) U.S. Cl. ....................................... 707/654
(58) Field of Classification Search .................. None
See application file for complete search history.

(56) References Cited

U.S. PATENT DOCUMENTS

| | | | |
|---|---|---|---|
| 4,626,836 A | 12/1986 | Curtis et al. | |
| 5,070,470 A | 12/1991 | Scully et al. | |
| 6,363,352 B1 | 3/2002 | Dailey et al. | |
| 6,388,772 B1 | 5/2002 | Williams | |
| 7,082,402 B2 | 7/2006 | Conmy et al. | |
| 7,974,849 B1 | 7/2011 | Begole et al. | |
| 2001/0014866 A1 | 8/2001 | Conmy et al. | |
| 2001/0014867 A1 | 8/2001 | Conmy | |
| 2002/0016729 A1 | 2/2002 | Breitenbach et al. | |
| 2003/0004772 A1 | 1/2003 | Dutta et al. | |
| 2003/0040946 A1 | 2/2003 | Sprenger et al. | |
| 2003/0204474 A1 | 10/2003 | Capek et al. | |
| 2004/0039630 A1 | 2/2004 | Begole et al. | |
| 2004/0167877 A1 | 8/2004 | Thompson | |
| 2005/0033614 A1 | 2/2005 | Lettovsky et al. | |
| 2005/0154620 A1 | 7/2005 | Hentschel et al. | |
| 2005/0193011 A1 | 9/2005 | Peebles et al. | |
| 2005/0262164 A1 | 11/2005 | Guiheneuf et al. | |
| 2006/0106655 A1 | 5/2006 | Lettovsky et al. | |
| 2006/0155591 A1 | 7/2006 | Altaf et al. | |
| 2006/0206363 A1 | 9/2006 | Gove | |
| 2006/0276960 A1 | 12/2006 | Adamczyk et al. | |
| 2007/0033103 A1 | 2/2007 | Collins et al. | |
| 2007/0143412 A1 | 6/2007 | Qi | |
| 2007/0260591 A1* | 11/2007 | Ahi et al. .......................... 707/3 | |
| 2009/0031232 A1 | 1/2009 | Brezina et al. | |
| 2009/0083229 A1 | 3/2009 | Gupta | |
| 2009/0215469 A1* | 8/2009 | Fisher et al. ............... 455/456.3 | |
| 2009/0327169 A1 | 12/2009 | Kamar et al. | |

* cited by examiner

*Primary Examiner* — Truong Vo
(74) *Attorney, Agent, or Firm* — Kenyon & Kenyon LLP

(57) ABSTRACT

A system and method to integrate a service in a calendar application. A service integration module and a calendar application may be installed on a client computing device. The service integration module may have read and write access to the calendar application of the client computing device and may submit a service request to a remote service. The service request may be a call of a first web service interface of the service and may initiate the execution of the service which may generate a result. The service integration module may receive the result. The service integration module may process the result, which may include extracting data required for specifying an event in an electronic calendar of the calendar application. The service integration module may create, delete, or modify an event in the electronic calendar of the calendar application.

20 Claims, 10 Drawing Sheets

COMPUTER IMPLEMENTED METHOD FOR INTEGRATING SERVICES IN A CALENDAR APPLICATION VIA WEB SERVICES

FIELD OF THE INVENTION

The present invention relates to the field of data processing, and more particularly to a computer implemented method for integrating services in a calendar application via web services.

BACKGROUND AND RELATED ART

Calendar applications are software applications comprising an electronic calendar. In addition to providing a calendar functionality, calendar applications may assist in managing events and dates, may comprise address books and integrated e-mail clients. They assist in organizing meetings by providing a meeting request functionality for inviting multiple persons to meetings and telephone conferences. Microsoft Outlook, for example, provides the user with means to invite one or more potential participants to join a meeting via a meeting request e-mail sent to the e-mail addresses of the invited persons.

A core limitation of current calendar applications is the fact that they are decoupled from the events of the real world they are supposed to help organizing. If an event or an activity in the 'real world' has to be postponed or modified, these changes usually have to be entered in the calendar application manually in order to update the data objects in the electronic calendar resembling those events of the real world. The multitude of manual steps which have to be exercised in order to synchronize the events in the electronic calendar (the data objects) with the events in the real world costs considerable time and effort and may lead to errors. In addition, many tasks have to be manually exercised repeatedly, e.g. the booking of train tickets, the booking of a table in a restaurant or the search for trip accompanies with the help of a trip sharing service. In particular for uniformly executed, repeated tasks, the automated execution of the corresponding services and an automated synchronization of the service with the calendar application would highly be appreciated by many users of calendar applications.

In the following, the term 'event' refers to data objects being stored in, written to or read from an electronic calendar of a calendar application, the data objects representing an event in the real world. The data object comprises data being adapted to specify an event. For example, an event in an electronic calendar may comprise a starting time, an ending time, a location or the subject. The data object can be manipulated by the commands of a programming language. An event can be a singular event or a recurring event comprising a particular recurrence pattern.

As the calendar applications currently in use are not able to communicate with services assisting in organizing events such as trip events or business appointments automatically, the user currently fulfils the function of a human interface between the calendar application and the services: the user has to remember multiple passwords, log into multiple services in order to book flights, order taxies or buy train tickets. While the user exercises a task, e.g. buys a train ticket, he is notified about the actual departure and arrival time of the chosen connection. This information in the next step has to be entered by the user in the electronic calendar manually.

The tasks mentioned in the previous examples commonly and repeatedly occur in business as well as private life but currently no adequate solution exists to execute them automatically, thereby saving working time, preventing the introduction of errors and ensuring that the electronic calendar is up-to-date, synchronized with the real world and free of inconsistencies.

SUMMARY OF THE INVENTION

The present invention provides a computer implemented method for integrating one or multiple services in a calendar application via a service integration module. The service integration module according to one embodiment of the invention is a software component installed on the same processing device as the calendar application and having read and write access to the electronic calendar of the calendar application. According to a further embodiment of the invention, the service integration module is installed on a computer having installed a groupware server of the calendar application. The service integration module in operation is capable to submit service request via an interface provided by the service. Depending on the embodiment of the invention, the service integration module is in addition able to receive the result generated by the service and create, delete and modify events according to the received result into the electronic calendar. According to further embodiments of the invention, the service integration module in addition may facilitate the entry and specification of the service request via a GUI or be able to predict required events and submit corresponding service requests automatically. The presented method can be used to integrate services into any calendar application, e.g. Microsoft Outlook, Apple iCal, Mozilla Thunderbird, Google Calendar, Blackberry Calendar, Lotus Notes, the iPhone Calendar and many more, provided that the provider of the service to be integrated makes a service integration module available to the user, the service integration module being interoperable with the respective calendar application.

The integration of services into an calendar application according to the invention requires the installation of a service integration module on the client machine on which the calendar application is installed. Alternatively, the service integration module is installed on a machine hosting the groupware server of the calendar application. A groupware server, e.g. Microsoft Exchange Server, Lotus Domino or groupware servers based e.g. on the CalDAV internet standard (Calendaring Extensions to WebDAV) are software programs for scheduling information on a remote server. Said groupware servers like MS Exchange server manage electronic mail, calendaring, contacts and tasks of one or multiple calendar applications functioning as groupware-clients. For example, Microsoft Outlook is the groupware client of Microsoft Exchange server and the Lotus Notes calendar application is a groupware client of Lotus Domino. The groupware server manages the events and corresponding data of one or multiple electronic calendars each corresponding to a calendar application acting as groupware-client.

The term 'service integration module' denotes a software program being installed on the same client device as the calendar application, being interoperable with the calendar application and having read and write access to the calendar application. According to other embodiments, the service integration module is a software program installed on a computer or server running a groupware server of the calendar application. According to said embodiments, the service integration module is interoperable with the groupware server and has read and write access to said server.

The service integration module can be implemented as 'plug-in' or 'add-in' for the calendar application or the groupware server of the calendar application. It can also be implemented as an independent service program being registered as event listener with a calendar event of a calendar application or the groupware server of the calendar application. It can also be implemented as an independent service program updating the electronic calendar on a regular basis. As said service integration module has to be interoperable with the calendar application or the respective groupware server, the implementation details of the service integration module depend on the type and version of the calendar application, e.g. on a particular version of Microsoft Outlook or Lotus Notes or the corresponding groupware servers.

The invention according to one embodiment comprises the step of sending service requests (SR) to one or multiple services via a first web service interface provided by each service. The service request is submitted by the service integration module. Depending on the embodiment of the invention, the service requests can be submitted automatically, semi-automatically or according to the specifications of a user entered manually into a GUI of the service integration module. The term 'web service' in the following does not refer to a web service in the strict meaning of the word (a software system for machine-to-machine communication based on SOAP, the XML based interface of the service being described by an WSDL file). Accordingly, the term 'web service interface' does not necessarily refer to an XML based interface described by an WSDL file and supporting the data exchange via web services in the strict meaning of the word. Rather, the term 'web service' in the following denotes any kind of communication technology for exchanging data between two processing devices. The term 'web service' as used in the following therefore includes web services in the strict sense, e.g. RESTful web services, but includes also the exchange of data via SMSs, Http requests, remote procedure calls (RPC), CORBA, DCOM, RMI or any other communication technology. The term web service also includes data exchange via RDS, satellite link, e-mails or SMS interface or via instant messaging based e.g. on XMPP/Jabber. Web services in the strict sense, conforming to the specification of the world wide web consortium (W3C) will in the following be referred to as 'W3C web services' and their corresponding XML based interfaces will be referred to as 'W3C web service interface'. The W3C web service may according to some embodiments of the invention be registered in an UDDI registry.

The service, after receiving the service request, processes the data submitted in the service request and executes one or multiple service routines. Depending on the implementation of the service, second order services may be called and data may be read from or be written to various storage facilities, e.g. databases. According to one embodiment of the invention, the service returns the generated result immediately after having finished the processing of the service request. The result is returned via an interface that is accessible by the service integration module. The interface used by the service integration module to submit the service request to the service to be integrated in the calendar application is referred to as 'first web service interface' and may be the same or a different interface as the interface used by the service to return the generated result. In case the service does not use the first interface to return the result, said interface used for returning the result to the service integration module is referred to as 'second web service interface'. After receiving the result generated by the called service, the service integration module extracts data from the result which is required to specify an event in the electronic calendar of the calendar program. This data usually includes a time information, e.g. the starting time or ending time of an event, and may in addition comprise a location of the event or further event associated information. The data is used by the service integration module according to one embodiment of the invention to create a new event or modify an existing event according to the data contained in the received result. Finally, the event is written into the electronic calendar of the calendar application.

The result generated by the service after receiving the service request may be returned immediately or after a period of time, e.g. after some minutes, hours or even days depending on the type of the service. Depending on the service, a result may be returned only in case a particular result could be obtained. It is also possible that the receipt of a service request is necessary, but not sufficient for the service to generate a result: only in case of additional incidents, e.g. congruent requests submitted by other persons, a positive result may be generated by the service and returned to the client.

According to a typical use case scenario of one embodiment of the invention, a supplier of a service provides a service integration module for download on the company's homepage, e.g. in the form of a plug-in for a particular calendar application like Microsoft Outlook and a particular operating system, e.g. Microsoft Windows XP. After installing the plug-in on the client machine, the plug-in in operation is capable to submit service requests to the service the plug-in was created to communicate with. The plug-in may be provided by e.g. by a company running a commercial service in order to facilitate the submission of service requests to the service and to facilitate the management of the result returned by the service. As the result is integrated in the electronic calendar of a calendar application, the service result can be managed by the user very easily. The plug-in may therefore help to boost the usage of the service. The increased number of service requests may, depending on the service, be connected with an increased economic profit of the service provider.

For example, a railway company could provide a plug-in for Microsoft Outlook for download on its homepage, the plug-in providing the possibility to call a remote ticketing service hosted on a server of the railway company via a W3C web service interface. The W3C web service interface provides access to the ticketing service. A user specifies via a GUI provided by the plug-in a train ride he plans to take. The service integration module creates a service request based on the specifications of the user. The service request comprises the request to order a train ticket according to specifications of the user. The service request is submitted by the user via the service integration plug-in to the W3C web service interface of the ticketing service of the railway company. The manual specification of a service request via the GUI of the service integration module (manual submission of a service request) is not the only way to submit a service request. Alternatively, the service integration module may have automatically submitted a service request in case some condition checking program routines of the service integration module detected a necessity to submit the service request. For example, if the user takes the same train connection every Friday evening, he could specify a recurring service request in the service integration module.

Alternatively, the service integration module could autonomously submit a service request if some conditions are met by existing events in the calendar application or by any other data objects evaluated by the service integration module. The service integration module may, depending on the embodiment of the invention, submit the detected required service request fully automatically to the service. In case the service integration module detects the necessity for a service request but postpones the submission of the service request until the user has approved to their submission, this approach of calling a service is called 'semi-automatic'.

After having received the service request, the ticketing service hosted on the server of the railway company is executed. The service returns a result in a synchronous way as XML file via the same interface used for submitting the service request. According to said use case scenario, the result returned via the first web service interface is a W3C web service response. According to other embodiments, the service request and the retrieved result are asynchronous. For example, in case a service takes several hours or days for execution, an asynchronous receipt of the result by the client is preferable, e.g. via asynchronous web services or by returning the result as SMS. The result may comprise a list of five best matching train connections according to the specifications of the planned trip in the service request. In the next step, the plug-in may take the data from the best matching connection, e.g. departure and arrival time to specify a 'possible train trip event' and write that event into the electronic calendar of the calendar application. Alternatively or in addition to creating a new event, the software integration module having read and write access to an electronic calendar may also modify and update one or multiple existing events in the electronic calendar.

According to a further embodiment of the invention, the result generated by the service is returned to the client machine via a different interface than that used for submitting the service request. For example, the ticketing service of the railway company may have been called by a service request submitted to the first web service interface, in this case, a W3C web service interface, while the result generated by the service may be sent via SMS to the service integration module on the client device. The service integration module according to this embodiment must in operation be able to receive and process SMS messages. The interface used for communication (submitting service requests to the service, receiving the result generated by the service) may depend on various factors. In case a service provides multiple different interfaces, an important aspect determining which interface should be used for data exchange is the availability of a particular data exchange infrastructure, e.g. the availability of the Internet. User-specific preferences contained e.g. in user profiles of users having registered for the service may also be considered. In the following, the interface used by the service to return the result will be referred to as 'second web service interface'. Here again, the term 'web service' does not necessarily refer to web services in the strict meaning of the word. Rather, any kind of data exchange technology between two processing devices is referred to. The same applies to the meaning of the term 'web service interface'.

According to a further embodiment of the invention, the second interface is an e-mail interface and the result is returned to the calendar application in the form of a meeting request e-mail sent to the user of the calendar application, the user having submitted the service request. A peculiarity of said embodiment is the fact that the service integration module is, according to this scenario, is no longer required for receiving the generated result. Its main function is the submission of service requests. As the calendar application can receive the meeting request e-mail used for updating the calendar automatically, it is according to this application scenario not necessary that the service integration module receives and processes the result.

According to a further embodiment of the invention, the service integration module creates multiple events in the electronic calendar of the calendar application after the receipt of the service result or modifies existing events. e.g. by supplementing the event's data with data derived from the result. According to the example described in the preceding paragraph, five new events representing the five best matching potential train trips could have been created in the electronic calendar by the service integration module.

According to a further embodiment of the invention, the service integration module and the remote service exchange data multiple times before one or multiple events are created in the electronic calendar. For example, the first service request of the service integration module sent to the ticketing service of the railway company may have resulted in the creation of a ranked list of 10 potential train trips varying regarding the ticket price, the train type, departure and arrival time or the kind of seats still available for reservation. The service integration module, in this case a plug-in, provides the user with means to specify user preferences regarding said trip features in order to enable the plug-in to automatically determine the best matching train connection. Based on the user defined settings, the plug-in determines the best matching connection. It does not create a corresponding event in the calendar at that point, but rather submits a second request to the W3C web service interface of the railway company's ticketing service to automatically buy a ticket for the best matching train connection. The service processes the second request, books a ticket, may in addition reserve a seat, and return the details of the bought ticket via the W3C web service interface to the plug-in. The connection details may comprise for example the train number, departure time, the ticket price and platform. The plug-in reads the result of the second service request, extracts data required to specify an event and writes an event with corresponding starting and ending time and additional information into the electronic calendar.

According to a further embodiment of the invention, the service integration module comprises a graphical user interface (GUI). The GUI provides the user with additional means to efficiently specify service requests to services which shall be integrated in a calendar application. For example, various graphical elements such as drop down menus, text boxes or check boxes may be used in order to facilitate the process of entering data to the service integration module.

According to a further embodiment of said invention, the GUI may in addition be used to display one or multiple intermediate results. The intermediate results, e.g. the five best matching potential train trips of the preceding example, could be displayed to the user for selection. The specifications of the selected train connection would be according to this scenario be sent to the service in a second service request. The second service request could, for example, comprise the request to buy a train ticket for the selected connection. A second result would be generated by the service, comprising for example a confirmation of the successful ordering of the ticket and additional information, e.g. on the train number and the reserved seat.

According to a further preferred embodiment of the invention, the services are hosted on servers being accessible e.g. via a network connection, e.g. the Internet or an Intranet of a company, a LAN or a WAN. The term network connection in the following also includes the availability of electronic means for exchanging data between a processing devices, e.g. between a client device and a server, e.g. via satellite based communication using SMS or instant messages.

The seamless integration of services into calendar applications according to preferred embodiments of the present invention reduces the number of tasks a user has to execute manually in order to organize a trip or an appointment. The term trip and travel will in the following be used synonymously. Embodiments of the present invention render many manual update steps unnecessary as the results returned by the called services are used to update the calendar application automatically or semi-automatically, thereby also reducing possible sources of error.

According to a further embodiment, the specification of locations within a service request (SR) by a user is facilitated by a process of replacing tags by unequivocal addresses. Unequivocal address information is required by many services in the context of appointment and trip management, e.g. for calculating the distance between two locations and for estimating the required travel time. The entry of those unequivocal addresses is, however, time consuming, as most people memorize only a very limited number of complete addresses including street, house number and postal code. Usually, people use the names of persons, buildings or activities when referring to particular places, e.g. 'Mike', 'Mr. Peters', 'the Pentagon', 'Home' or 'Work'.

According to said embodiment of the invention, the user is allowed to enter ambiguous names, for example 'Mike' or 'Home', in order to refer to an unequivocal address including street, house number and postal code. The ambiguous tags are mapped to unique addresses, the addresses being used in further processing steps. In contrast to complete address blocks, those tags can be entered by the user very quickly and conveniently. It is possible, for example, to specify a route by entering 'from Mike to Tom' or 'from Home to Work'. In order to calculate the route to get from one person to the other, e.g. by a route planning service, those tags have to be mapped to the complete address of each person. As the name 'Mike' may, depending on the user, denominate different persons located in different places, a personalized, user-specific mapping and tag replacement has to take place. In order to calculate a route based on location tags contained in a service request, a personalized mapping schema specifying to which address the name 'Mike' has to be mapped is required. The personalized mapping information may be provided as additional information within the service request or may be a part of a user profile available to the service.

According to a further embodiment of the invention, the mapping also comprises the mapping of general terms and names to unequivocal addresses, e.g. 'Pentagon' or 'White House' and the mapping of group specific tags. The general and personalized tags of a user profile according to said embodiment of the invention can be supplemented by tags being specific for a particular social group the user belongs to. The user being registered for a service may be member of a particular social group, e.g. a social network such as Xing or MySpace, may belong to the personnel of a company or a particular department of a company. In case the department of the company the user is working at organizes a Christmas staff party at a particular restaurant, the tag 'Christmasparty' may be mapped to the unequivocal address of the restaurant for all user profiles being member of said social group. The process of mapping comprises a text analysis step in which token boundaries are determined, in which some of the tokens are recognized by the service as tags representing unequivocal addresses and wherein regular expressions may be applied in order to identify location tags.

According to a further embodiment of the invention, the mapping of location tags to unequivocal addresses also comprises the mapping of tags to routes. According to this use case scenario, the service request may comprise one single tag representing a route rather than two location tags representing the starting point and destination. For example, the tag 'Highway' could represent the route from 'Work' to 'Home' via the highway, while the tag 'Countryroad' refers to an alternative route from 'Work' to 'Home'. The required mapping information is derived, according to one embodiment of the invention, from a list of 'favorite routes' being contained in a user's profile. Alternatively, the mapping information could be specified within a text field of the service request.

The process of tag resolution may be executed on the client side hosting the calendar application or the groupware server of an calendar application, if the service integration module is operable to exercise the text analysis and personalized tag mapping. According to a further embodiment of the invention, the address book of the calendar application being locally available to the service integration module can be used for the task of personalized tag mapping: in order to map the tag 'Mike' to an unequivocal address, the contact list of the calendar is searched for an entry comprising 'Mike' in one of the name fields. In case there exists only one 'Mike' entry in the contact list, the address block of this entry can automatically be used for the mapping process. In case multiple entries comprising 'Mike' in their name fields exist, the user is asked, e.g. via a dialog window of the service integration component, which of the found addresses should be mapped to the 'Mike' tag. According to a further embodiment of the invention, the decision of the user is memorized by the service integration module in a 'mapping history'. In this case, the user is required to execute the selection step only once when the 'Mike' tag is used the first time. In all subsequent tag mapping processes, the mapping history is used to resolve a tag automatically.

The tag mapping according to a further embodiment of the invention may also be exercised on a server hosting a mapping service. In this case, the server must be able to analyze the text of the received service request, and must have access to the personalized mapping information required for tag replacement. According to a preferred embodiment, the tag replacement and corresponding text processing steps are adapted for the English language, but other languages can be supported by other embodiments of the invention as well.

According to a further embodiment of the invention, here referred to as 'explicit event specification', the user has to explicitly and manually determine and specify service requests e.g. via a GUI provided by the service integration module given the context of existing events in the calendar application. The user may, for example, specify a service request for a trip sharing service via the GUI of a trip sharing service integration component provided by the trip sharing service provider. The user has to specify the planned trip, wherein the specification comprises determining the earliest acceptable departure time, the latest acceptable arrival time, the place of departure and the destination or, alternatively, the route of the planned shared trip. The service request may comprise additional data being interpretable by the called trip sharing service. Further embodiments of the invention correspond to service integration modules in operation being able to integrate multiple different services. For example, a service integration module could integrate services for booking tickets for trains or concerts, for ordering tables in restaurants, for booking conference rooms and for ordering overhead projectors and other presentation devices for a particular conference room.

According to a further embodiment of the invention, here referred to as 'implicit required event prediction', the determination of required events, e.g. required trip events to get from one meeting to another, is based on knowledge which is implicitly contained in the calendar application. A trip event is an entry in an electronic calendar representing a trip. Other than the explicit specification of service request described beforehand, this approach does not require the user to explicitly specify service requests in order to call a service assisting in organizing a corresponding event of the 'real world' resulting in the creation of a data object (an event in the electronic calendar) representing this event in the real world. Depending on the embodiment of the invention, the implicit required event prediction may be implemented as an additional remote service or as an integral part of the service integration module located on the client side.

A further embodiment of the invention comprises an implicit required event prediction on the client side. The service integration module in operation analyzes a first event within the calendar application given the context of other events in the electronic calendar being in temporal proximity to the first event. According to a further embodiment of the invention, the implicitly predicted event is a trip, the trip being required to get from one event scheduled in the electronic calendar to the other. After having predicted a required event, e.g. a required trip event, to get from one meeting to the next, the service integration module executing said implicit required event prediction method automatically calls an appropriate service via a service request in order to organize the event or execute any other task related to this event. This scenario is especially advantageous if the quality of the prediction is high enough for the user to completely rely on the output of the prediction. According to further embodiments of the invention, the service integration module is capable of estimating the accuracy of the prediction of the required event based on the number of positive confirmations of predictions of required events of a particular type in the past.

Depending on the embodiment of the invention, the prediction of required trip events may be executed after the user has entered a new event or on a regular basis. The prediction may be executed for a newly entered event in the context of other events lying in temporal proximity to this event, it may be executed for all events within a calendar or for any other sub-set of events defined according to other criteria.

According to a further embodiment of the invention, the required events predicted according to the implicit required event prediction method are displayed to the user by the service integration module. The sending of service requests according to this embodiment is delayed until the user has approved to the predicted required events. The question, if a an approval by the user is required before services associated with the predicted required events are called may also depend on user defined settings.

According to a further embodiment of the invention, the service integration module is operable to exchange data with remote services e.g. via web services, CORBA, remote procedure calls or the like to receive user profile data from the remote service required for predicting required evens locally. If the user has specified in his user profile a time margin to be added to each predicted trip in order to be sure not to arrive late at a meeting, this time margin information could be received by the plug-in via accessing user profile data stored remotely by the host of the service.

Further embodiments of the invention comprise the integration of services for recurring events.

According to a further embodiment of the invention, the implicit required event prediction is executed on the server side. According to this application scenario, the specifications of all events being of relevance for the prediction of the required event have to be contained in the service request sent to the service. The number and type of the events being of relevance depends on the type of the service used for predicting required events. For example, a service for predicting long distance travels could require the received service request to comprise time and location information of a new event and additional events being scheduled at maximum two weeks before or after the new event. If the service is a service for ordering a taxi for short trips, this service may require the service request to comprise only a new event and additional events starting a few hours before or after the new event and being in addition located in the same town. The criteria used to select a subset of relevant events from the calendar application being submitted to a service for implicitly predicting required events on the server side therefore strongly depends on the called service. The service analyses the received service request and uses the event information contained therein to predict additional required events. In case one or multiple required events could be predicted by the service, a result is returned either via the first or via a second interface to the client. In case the result is received and processed by the service integration module, said module extracts the predicted required events from the result and creates new events or updates existing events in the electronic calendar accordingly. In case the result is returned directly to the calendar application via a meeting request e-mail, a further action of the service integration module is not required.

According to a further embodiment of the invention, the implicit required event prediction is also executed on the server side. However, the specifications of all events being of relevance for the prediction of the required event are not sent within one service request to the service. Rather, each event created in the calendar application is sent as one new service request to the server, resulting in a duplication of the electronic calendar on the server side. The service integration module according to this scenario is implemented as an event listener listening to the creation or modification of electronic events in the electronic calendar. On each creation of a new event or modification of an existing event, the event specifications are retrieved and sent by the service integration module in the form of a service request to the remote implicit required event prediction service. The implicit required event prediction service hosted on a remote server may execute the event prediction routines on a regular basis or upon receipt of each new service request. If, according to this scenario, the server predicts a new required event, the specifications of that event (time, location, additional data) are sent to the client machine via the first web service interface used by the service integration module for submitting the service request or via a different interface accessible and interpretable by the service integration module.

A service that can be integrated into a calendar application according to the present invention has to be accessible via a first web service interface, the first web service interface in operation receiving service requests submitted by a service integration module installed on a client or on a machine having installed a groupware server corresponding to the calendar application installed on the client. The service must be operable to interpret and process the service request and must be operable to return the generated result via the first or a different web service interface. The service in operation may call second or third order services via any available communication technology, e.g. web services, CORBA, remote procedure calls or the like. In case the second web service interface is an e-mail interface, the service integration module is not required to receive and process the result and to update the electronic calendar.

In case the user has created a user profile for a service, the processing of a service request by the service may also comprise the step of associating a service request to an existing user profile, e.g. based on a matching of the e-mail address of the service request and the e-mail address of the user-profile.

Information contained within this user-profile may be used by the service during the processing of the service request.

According to a further embodiment of the present invention, the called service is a trip sharing service which can be called and be seamlessly integrated to a current calendar application via a service integration module. This trip sharing service provides the user with the possibility to automate and facilitate the organization of shared trips. For example, the entry of a new meeting in the electronic calendar of the calendar application may automatically result in a request to the trip sharing service to search for appropriate trip accompanies. The service processes the service request and returns the result via the first or via a second web service interface.

Said seamless integration of the trip sharing service into current calendar applications is only one example for the integration of a service to a calendar application via the submission of service requests to the web service interface of remote services. It shall be explicitly stated here that, based on the presented approach, any kind of service may be integrated to a calendar application.

BRIEF DESCRIPTION OF THE DRAWINGS

In the following, embodiments of the invention are described by way of example, only making reference to the drawings in which.

DETAILED DESCRIPTION

Figure 1A:
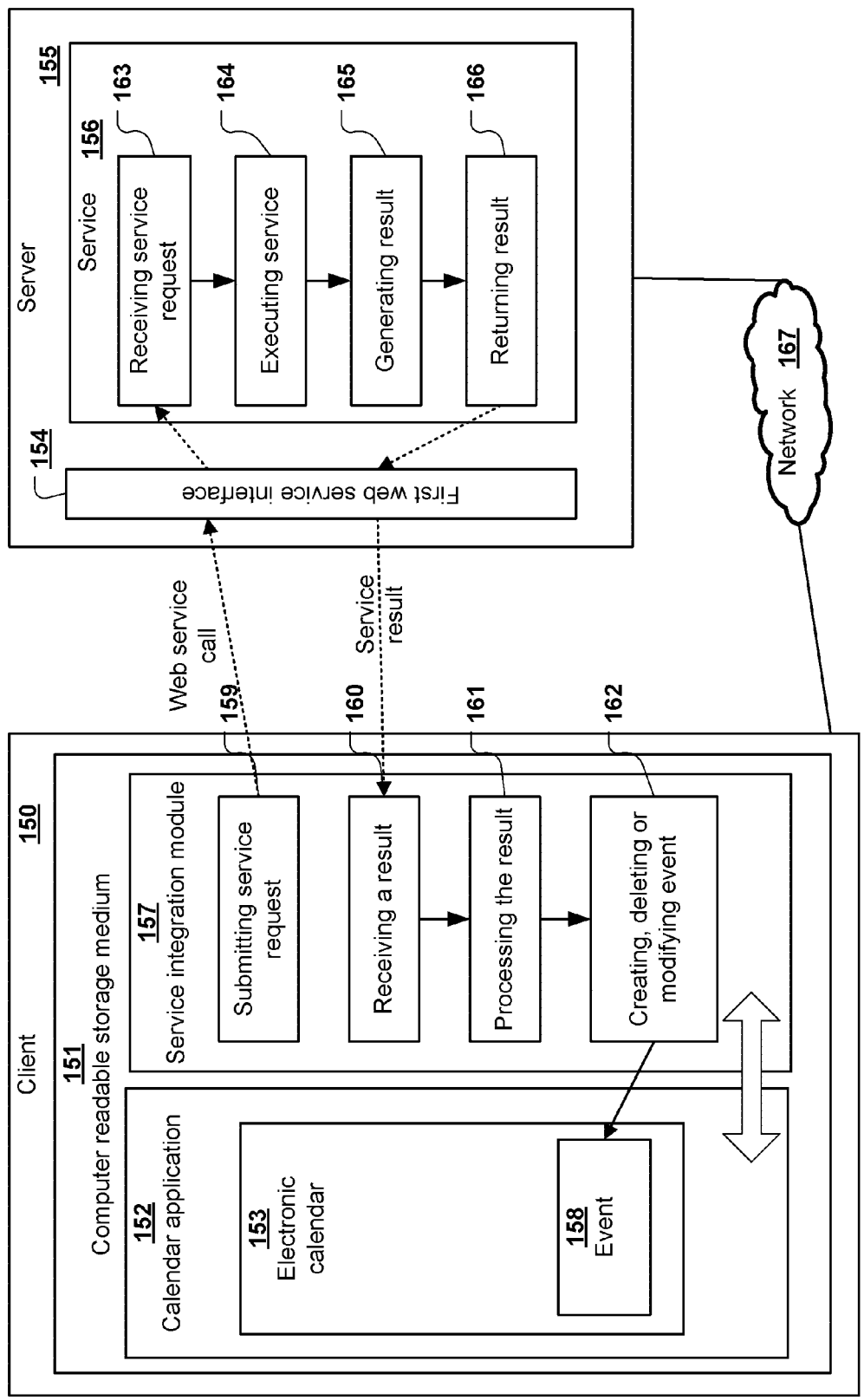
FIG. 1a illustrates the integration of a remote service in an calendar application, result being returned via the first web service interface and the updating of the electronic calendar being executed by the service integration module.

In the following like elements are designated by identical reference numerals throughout the various embodiments.

FIG. 1a depicts the integration of a service 156 in the calendar application 152 according to one embodiment of the invention. The calendar application 152 is installed on a client machine 150, e.g. a computer, mobile phone or other processing device. According to some embodiments of the invention, the client is operable to permanently or temporarily (transiently) connect to a network 167, e.g. the Internet or the intranet of a company. Other embodiments of the invention according to which the client 150 is, for example, a navigation device, are not connected via a network permanently to other devices but comprise means for exchanging data with other end user devices and servers, e.g. via a RDS, satellite link or a SMS interface and corresponding mobile telephony stations. According to a further embodiment of the invention, instant messaging based on the XMPP/Jabber protocol is used to call a remote service and receive results. The exchange of data via instant messaging is particularly advantageous as it is possible to dynamically indicate the status (the availability) of a particular service and to exchange data asynchronously. In the following, the term network will also subsume the existence of means for exchanging data between two devices via a defined data exchange interface and format which do not have to be in use permanently. The calendar application 152 comprises an electronic calendar 153 containing events, e.g. event 158. An event in an electronic calendar is a data object being characterized e.g. by date and time of the begin and end of the event, by an event location and by additional information, e.g. by information on the type of the event (meeting, telephone conference, a trip) or the list of participants. The server 155 hosts the service 156, the service being accessible via a first web service interface 154 and returning its result via the same interface. In the following paragraphs, the integration of service 156 into the calendar application 152 via the service integration module will be described, the service integration module updating the electronic calendar by creating new events or by modifying existing events depending on the result obtained from the called service 156.

In the first step 159, the service integration module submits a service request to a first web service interface 154 provided by the remote service 156. The web service interface is an interface adapted to a particular kind of data exchange format between two processing devices, including web services in the broad and in the strict sense as defined beforehand. The service request submitted in step 159 may be specified explicitly and manually by the user, e.g. via a GUI provided by the service integration module 157, according to some embodiments of the invention. According to other embodiments, the service request is submitted fully automatically or semi-automatically by the service integration module 157 if the module is operable to implicitly predict required events and service requests.

Depending on the implementation and settings of the service integration module, predicted required events and corresponding service requests may be submitted fully automatically or may be submitted after the user has approved to the submission of the service request (semi-automatic service request submission). The service 156 receives the service request in step 163, executes the service in step 164 and generates a result in step 165. The execution of the service is decoupled (asynchronous) from the submission of the service request. Step 164 may be executed immediately after receiving the service request or after a predefined period of time.

The service may also be executed repeatedly on a regular basis until a certain condition is fulfilled. The execution of the service may also be triggered by any other event, e.g. the submission of a congruent service request by another user. Which kind of trigger is used by the service for its execution depends on the service. The execution of the service in step 164 may involve the calling of one or more second order services (not shown) or the reading and/or writing of data from or to various storage media, e.g. a database. In step 166, the result is returned to the service integration module 157 installed on the client machine 150.

Figure 2:
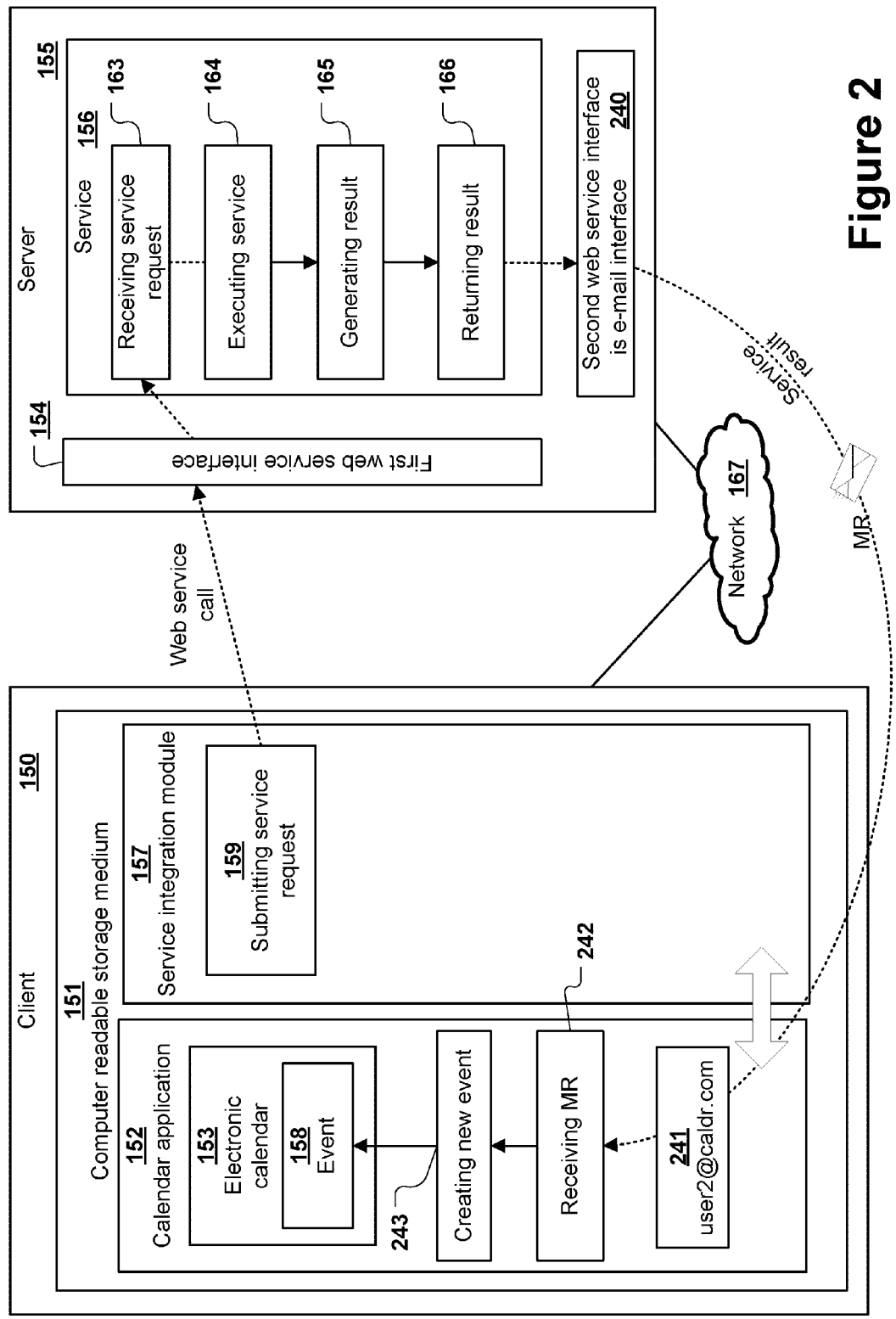
FIG. 2 illustrates the integration of a remote service in an calendar application, the updating of the electronic calendar being executed by the calendar application receiving a meeting request e-mail.

The result is returned via the first web service interface 154 as depicted in FIG. 2.

Figure 1B:
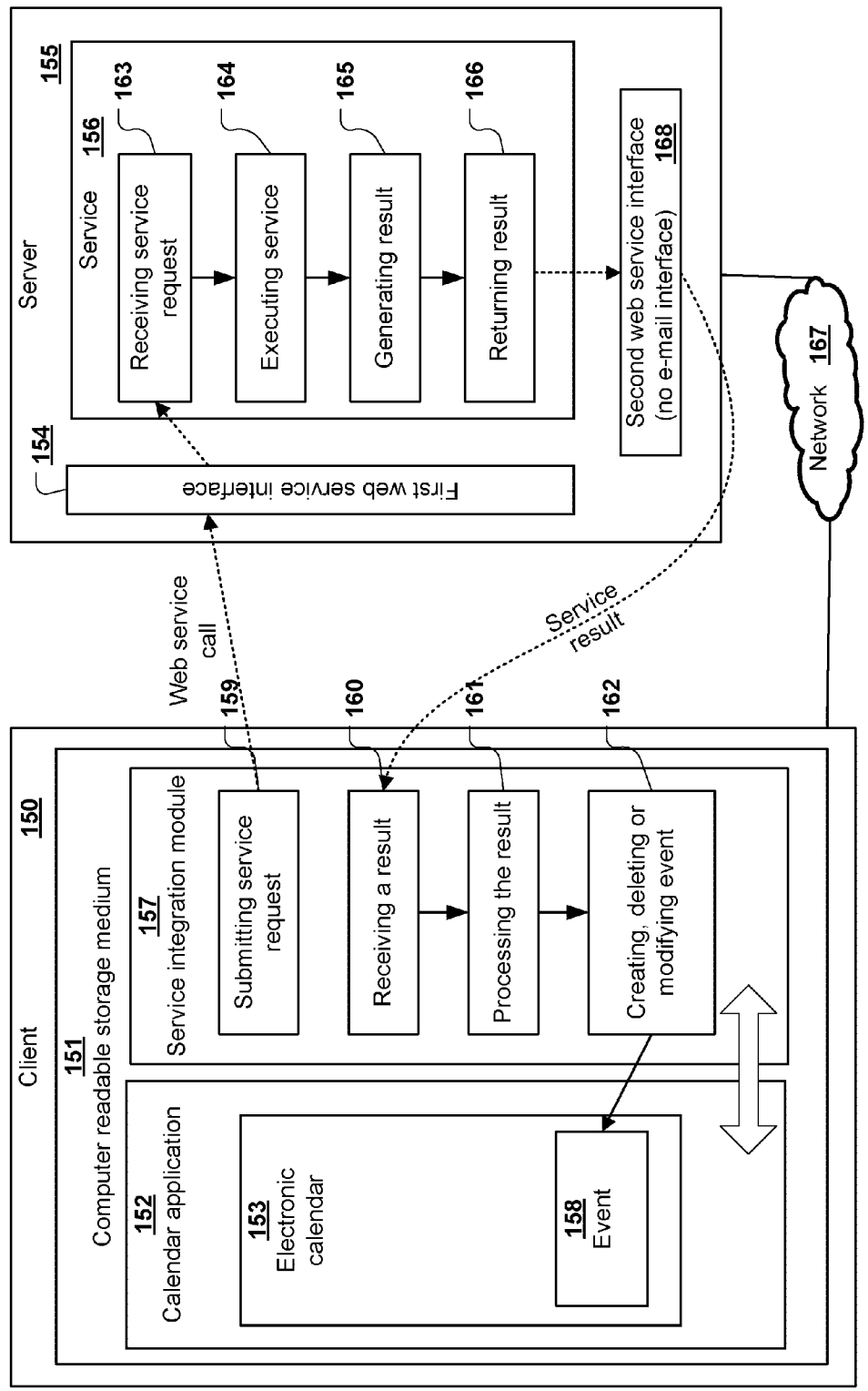
FIG. 1b illustrates the integration of a remote service in an calendar application, result being returned via a second web service interface and the updating of the electronic calendar being executed by the service integration module.

According to several embodiments of the invention, the first web service interface is a W3C web service interface based on XML and SOAP, because this communication technology is particularly advantageous for machine-to-machine communication as depicted in FIGS. 1a, 1b and 2. The service integration module calls a service via the first web service interface and may in addition retrieve the result via the same 154 or a different web service interface 168. Provided no human user is required to read the exchanged data, XML is particularly advantageous for data interchange between distributed software components because it can be parsed and processed easily, it can be used to represent data objects commonly defined by software applications written in an object oriented programming language and is supported by multiple freely available software libraries. Therefore, the interface used for data exchange, in particular for submitting service requests to the service, is in many embodiments a W3C web service interface. However, it shall be explicitly stated here that the present invention is not restricted to W3C web services.

Depending on the service and on the question if the availability of an Internet connection can be expected in situations in which a service is typically called, other data exchange technologies and interfaces may be used. For example, if the client device 150 is an old mobile phone lacking a network card and the integrated service is a taxi ordering service, the usage of a W3C web service interface may be inappropriate. Rather, the submission of the service request to the server via a SMS interface provided by the service would currently appear as more appropriate. The service integration module submitting the service request in step 159 and for receiving the result in step 160 according to the embodiment depicted in figure is uses the same web service interface 154, here referred to as first web service interface.

After the service integration module has received in step 160 the result generated by the service 156, the service integration module processes the result and creates an event 158 in the electronic calendar 153 in step 162. Alternatively, the service integration plug-in modifies an existing event in the calendar application. The existing event may be deleted or modified, e.g. by supplementing the event with additional data or by changing the staring or ending time or location of the event. Step 162 requires the service integration module to be interoperable with a particular calendar application, e.g. Microsoft Outlook or Lotus Notes, and to have read and write access to the electronic calendar 153.

According to a further embodiment, the service integration module 157 creates or modifies multiple events in the electronic calendar 153 after receiving and processing the result generated by the service. The result according to said embodiment comprises data for multiple events, which is parsed and used to specify and write multiple events by the service integration module. The parsed data typically comprises the starting and ending time of an event, a subject and a location. The data may comprise additional data or lack e.g. the location information, depending on the called service.

To simplify matters, the embodiments of the present invention according to which the service integration module is installed on the machine hosting the groupware server of the calendar application is not depicted. The exchange of data between said machine and the servers hosting the requested services is in principle the same as explained for the communication between the service integration module installed on the client hosting the calendar application. The service integration module installed on the groupware server machine has read and write access to the data managed by the group ware server. The managed data corresponds to electronic calendars of one or multiple groupware-clients. Based on said calendars, the service integration module may predict required events and services, submit service requests and update the electronic calendar(s) after receiving and processing the result from the service. In case service requests are submitted via the service integration module installed on the host machine of the groupware server, the results of the called service can be received by the said service integration module via a first or via a second web service interface. The service integration module processes the results and deletes, creates and modifies events in one or multiple electronic calendars of the clients by manipulating data of the groupware server. Alternatively, the service may return the results via an e-mail to an e-mail address of a user of the calendar application.

The submission of the service request to the first web service interface 154 and the receipt of the result by the service via the first web service interface 154 can be synchronous or asynchronous.

FIG. 1b illustrates an embodiment of the invention according to which the service uses a second web service interface 168 to return the results to the service integration module, the second web service interface being accessible by the service integration module. The second web service interface 168 as depicted in FIG. 1b and is an interface for exchanging data based on any kind of web service protocol with the exception of e-mails. The purpose of FIGS. 1a and 1b is to illustrate embodiments of the invention wherein the service integration modules communicates with the remote service (submitting service request, receiving results) and integrates the result into the electronic calendar of an calendar application, thereby updating the electronic calendar. In case the service returns its result to the client via an e-mail, the service integration module is solely involved in specifying and submitting the service request, not in updating the calendar. Said situation and embodiment of the invention is depicted and described in FIG. 2, wherein the second interface 240 is an e-mail interface and the result is returned in the form of a meeting request directly to the calendar application.

According to embodiments of the invention depicted in FIG. 1b, two different web service interfaces for receiving a service request and for returning the result are used by the service, depending on the service integration component, the service and the communication technology which can be assumed to be available to the client in situations in which the service is usually called.

The submission of the service request to the first web service interface 154 and the receipt of the result by the service via the second interface 168 can be synchronous or asynchronous.

FIG. 2 illustrates a further embodiment of the invention according to which a service 156 is called by a service integration module 157 as described for the embodiment depicted in FIG. 1. The embodiment depicted in FIG. 2 differs from the embodiment depicted in FIG. 1 in that the result is returned via an e-mail interface 240 in the form of a meeting request (MR) e-mail from the service to the client. The MR e-mail is sent to the e-mail address 241 of the user of the calendar application 152, the user being the same user who submitted the service request directly or indirectly (manual specification of a service request or automatic/semi-automatic submission of a service request by the service integration module started by the user). According to a further embodiment of the invention, the e-mail address and the instruction to return the result via the e-mail interface have been specified in the service request submitted in step 159. According to a further embodiment of the invention depicted in FIG. 1 or 2, the service request comprises information enabling the service 156 to map a user profile to the service request and to send the result via the preferred communication interface as specified in the settings of the user's profile. The embodiment of the invention depicted in FIG. 2 requires the service integration module 157 solely for submitting the service request. The service integration component is not required for receiving the result and for creating and writing new events to the electronic calendar 153, because these tasks are executed by the calendar application 152 in steps 242 and 243. The calendar application is operable to send and receive e-mails via the e-mail address 241 of a user of the calendar application. As the result is returned in step 166 via a meeting request e-mail directed to the e-mail address of a user of the calendar application, the creation of a new event corresponding to the meeting request e-mail is executed by the calendar application upon receipt of the meeting request e-mail.

According to a further embodiment of the invention depicted in FIG. 1 or 2, the service integration module comprises a graphical user interface (GUI) facilitating the entry and specification of a service request. For example, a plug-in integrating a ticketing service of a railway company into the calendar application Microsoft Outlook could provide the user with means to specify service request interpretable by the service. The user is provided with means to specify default settings for ordering train tickets by the service integration module. The settings comprise e.g. the user's preference regarding the reserved seat (saloon coach, compartment coach, first or second class) or regarding the type of the connection (regional train or express train). GUI elements specially adapted to facilitate the entry of data for ordering a train ticket could, for example, comprise a popup window resembling a small calendar for selecting dates and being displayed upon setting the mouse cursor on an input field regarding the starting time and date of the planned train trip.

According to a further embodiment, a service integration module integrating a remote trip sharing service provides the user with means to conveniently specify his trip sharing preferences, e.g. his driver/passenger preferences. Said service integration module may display graphical elements like drop down lists and checkboxes facilitating the specification of service requests for a particular trip via a particular route.

In summary, the main purpose of the service integration module is to integrate a service to a calendar application by submitting one or multiple service requests to a remote service. In case the result generated by the service is not returned via a meeting request e-mail directly to the calendar application, but via the first 154 or a second interface accessible to the service integration module, the service integration module may in addition receive and process the result, specify one or multiple events and write the events into the electronic calendar of the calendar application. In addition, the service integration module may provide features such as an implicit required event prediction or the provision of a GUI facilitating the entry of a service request by the user.

Figure 3:
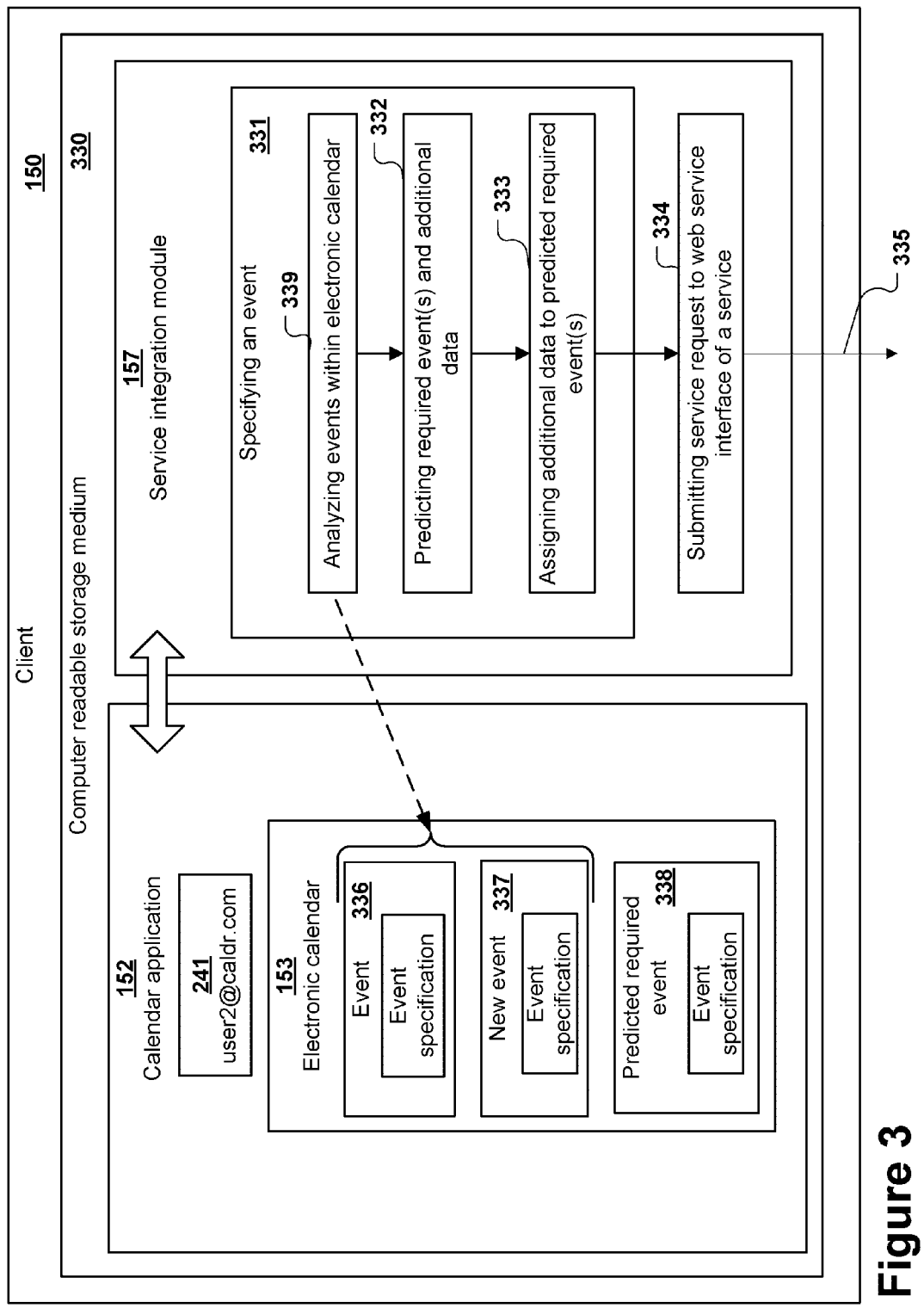
FIG. 3 illustrates a calendar application and a service integration module being operable to predict required events according to the 'implicit required event prediction' approach.

FIG. 3 illustrates a computer readable storage medium 322 according to a further embodiment of the invention, the storage medium comprising instructions for a processor for executing a calendar application 152 and a service integration module 157. The service integration module in operation has read and write access to the data contained in the electronic calendar 153 of the calendar application. The service integration module is operable to submit a service request to a first web service interface of at least one service. The implementation of the service integration module depends on the operating system and on the type of the calendar application 152 installed on the client 150 (Microsoft Outlook, Lotus Notes, Blackberry calendar). The service integration module 157 can be implemented as 'plug-in' or 'add-in' for the calendar application or the groupware server of the calendar application. It can also be implemented as an independent service program being registered as event listener with a calendar event of the calendar application or with an event of the groupware server of the calendar application. The service integration module can also be implemented as an independent service program searching the calendar application or the groupware server of the calendar application for new calendar entries and updating the calendar on a regular basis.

The service integration module 157 in operation analyzes in step 339 the events contained in the electronic calendar 153 in order to predict events or service request necessary or useful for organizing the events in the real world represented by the existing calendar event data objects. The begin of the analysis step 339 is triggered according to one embodiment of the invention by the entry of a new event by the user. Step 339 can also be initiated and executed on a regular bases in predefined time intervals according to a further embodiment. In step 339, all events within a calendar or only a subset of events may be evaluated. The subset of events to be evaluated can be determined e.g. by the temporal proximity of an event 336 to a newly entered event 337 or any other criteria depending on the implementation of the service integration module 157.

According to a further embodiment of the invention, all events of the electronic calendar being in temporal proximity to a newly entered event 337 are used by the service integration module 157 for the prediction of required trip events. If, for example, event 336 is a business meeting in the office of an employee at 9.00 a.m. already existing within the calendar application and the newly entered event 337 is a business meeting in another town at 4 p.m., then the service integration module 157 predicts in step 332 that a trip is required in order to get from the office to the meeting in the other town in time. The service integration module 157 may execute several additional computation tasks depending on the implementation of 157. For example, the service integration module 157 could comprise the functionality of mapping tags contained in the location or text body fields of events to unequivocal addresses. If the meeting locations have been entered in the electronic calendar in the form of ambiguous names, e.g. 'Mike' or 'Mr. Miller', these location tags are replaced by their respective unequivocal addresses. The mapping of route tags to routes is also supported. In addition, or alternatively, the unequivocal addresses of the first and the second meeting place may be used by service integration module 157 to predict the best route, predict the route with the shortest travel time and to suggest a time of departure corresponding to the specified route. The prediction of the best route may also depend on user specific settings if available to the service integration module 157. The ending time of the first event and the starting time of the following event may determine the earliest acceptable starting time and the latest acceptable arrival time for the planned trip. Those settings may comprise data on the driver/passenger preferences of the user registered for the trip sharing service. In step 333, additional data which may be required by the trip sharing service for processing the service request is assigned to the predicted required event. In step 334, the service integration module 157 submits a service request to the first web service interface of a trip sharing service assisting in organizing the trip, the request comprising the start and ending time of the predicted required event. The request may comprise additional data provided by the service integration module 157.

According to one embodiment of the invention, the service integration module 157 in step 334 automatically initiates the submission of a service request to the first web service interface of the service.

Depending on the implementation of the service integration module and the prediction result, step 332 may also comprise the prediction of multiple required events of different types. For example, service integration module 157 could have predicted the required event of a trip to get from one appointment to the next appointment, and could have in addition predicted the requirement of ordering a business gift for a particular meeting participant in time resulting in the submission of one service request to a trip sharing service to organize the trip and the submission of a second service request to a vendor of business gifts.

According to a further embodiment of the invention, the predicted required events are presented to the user of the calendar application before submission, they are not used to automatically specify and submit service requests to the services. The user has the option to check if he really wants to submit the predicted required service request, e.g. to the trip sharing service. In case the user accepts the prediction of the service integration module 157 and marks a predicted required event accordingly, the corresponding service request (s) are submitted to one or multiple services. This embodiment of the invention is particular beneficial if the predicted required events and actions often vary depending on multiple additional factors and an automated service request may therefore be inappropriate. In case the user feels ill and does not know in advance if he will be able to join a meeting scheduled in the following week, the user in this case has the option to delay his approval to the submission of the service requests until he is sure to be able to join the meeting and to make use of the trip sharing service.

According to a further embodiment of the invention, the service integration module 157 is used to predict required trip events and to submit corresponding service requests to a trip sharing service. The service integration module 157 predicts required trip events to get from one appointment to the next. The service integration module analyzes all events 336 being in temporal proximity to a particular event 337, e.g. an event that has just been added to the calendar application. The analysis according to one embodiment of the invention is initiated by the entry of the new event 337, but according to other embodiments, the analysis could be triggered by other events or be executed on a regular basis.

According to a typical use case scenario, a supplier of a remote service provides the service integration module 157 in the form of a downloadable service integration module 157, e.g. a downloadable plug-in, developed for a particular calendar application. e.g. Microsoft Outlook. After installation on the client machine, the plug-in in operation is capable to analyze the calendar application, to predict required events and actions and to send corresponding service requests to the service. The service providing the downloadable plug-in may also provide means for entering user profile data or any other additional data to the plug-in, this data being used as additional information submitted in the service requests.

The service integration module 157 may have access to the user's profile data via accessing an online service related to the service integration module 157 or via the user entering his profile data to the service integration module 157 manually. This user profile data, if available, and context data of the analyzed events (e.g. time and location) is used in the analyzing step 339 to determine required trip events to get from the first meeting event to the next.

The existing event 336 in the calendar may be a telephone conference on Monday, 9 a.m., having associated the location tag 'Work'. The second event may be a business meeting on 3 p.m. on the same day being assigned the location tag 'Dr. Millor Ltd.'. The plug-in predicts a required trip event to get from the employee's home to his office, the trip having an arrival time several minutes before the telephone conference starts. The time security margin can be specified by the user in the user profile, e.g. 15 minutes. In this case, the service integration module 157 will predict a required trip event from home to the employee's office with an arrival time 8.45 a.m. (15 minutes earlier than 9 a.m.). The predicted departure time is the earliest departure time acceptable for the user while the arrival time is the latest arrival time acceptable for the user. The latest acceptable arrival time can be calculated by considering the starting time of a meeting in combination with a time margin specified e.g. in the user's profile data ensuring the user does not arrive late at a meeting. The predicted starting and arrival time therefore specify a time window within which the user is willing to travel. The service integration module may in addition predict further trip events required during the office day, e.g. in order to get from the office to the meeting scheduled at 3 p.m. in another town, or predict trip events required for spare time activities, e.g. to travel from the office to a movie theater. The prediction comprises the following steps:

1. map ambiguous tags, e.g. 'Mike', 'Home', 'Work', 'Movie theater' and the like contained in the location field of the analyzed calendar events to unequivocal, complete addresses comprising street name, house number and postal zip code. The mapping according to a further embodiment of the invention uses the local address book/contact list, the history of recently mapped tags and their corresponding address blocks or of mapping information stored in the users profile, if available.
2. Predict the route of the trip based on the complete start and destination address according to user defined criteria, e.g. the user defined security margin regarding the arrival time.
3. Assign additional, user specific data to the predicted trip if available, e.g. the user's preference to drive or act as passenger.
4. Predict the travel time for the predicted route.
5. The predicted required trip events may now be submitted automatically to the trip sharing service via a service request created by the service integration module 157 to the interface of the trip sharing service. If the user has specified that the predicted required trip events should not be submitted to the corresponding service automatically, the predicted trips are collected in a list. The list of predicted trips is then presented to the user. The user may check the predicted trips for correctness of the prediction and may also alter some properties of the predicted trips, e.g. the time of departure or arrival. The user may also delete predicted trips. After checking and optionally editing the predicted trips, the specifications of the predicted trips are used by the service integration module 157 and submitted as service requests to the first web service interface of the trip sharing service. The user may at any time deactivate the manual approval step and switch to automated submission of the predicted required trip events as service request to the trip sharing service if the quality of the predictions is sufficient.
6. The service request is then processed by the remote trip sharing service as described in detail for the embodiment depicted in FIG. 6. In summary, the trip sharing service searches for users intending to travel the same route or the same part of the route at almost the same time as specified for the trip contained in the service request. The profile of the users and potential trip accompanies are in addition checked for compatibility with the specifications of the user sending the request.

7. In case the trip sharing service was able to detect one or multiple user profiles associated to matching trip plans and preferences, the user receives a list of possible shared trips and associated trip accompanies matching with the trip specifications and the user preferences, e.g. driver/passenger preferences. The result is received by the service integration module via the same or a different web service interface or is received by the calendar application in the form of a meeting request e-mail. The user receiving the result may contact one or multiple potential trip accompanies with the help of the contact data being also contained in the result returned by the trip sharing service.

Figure 4A:
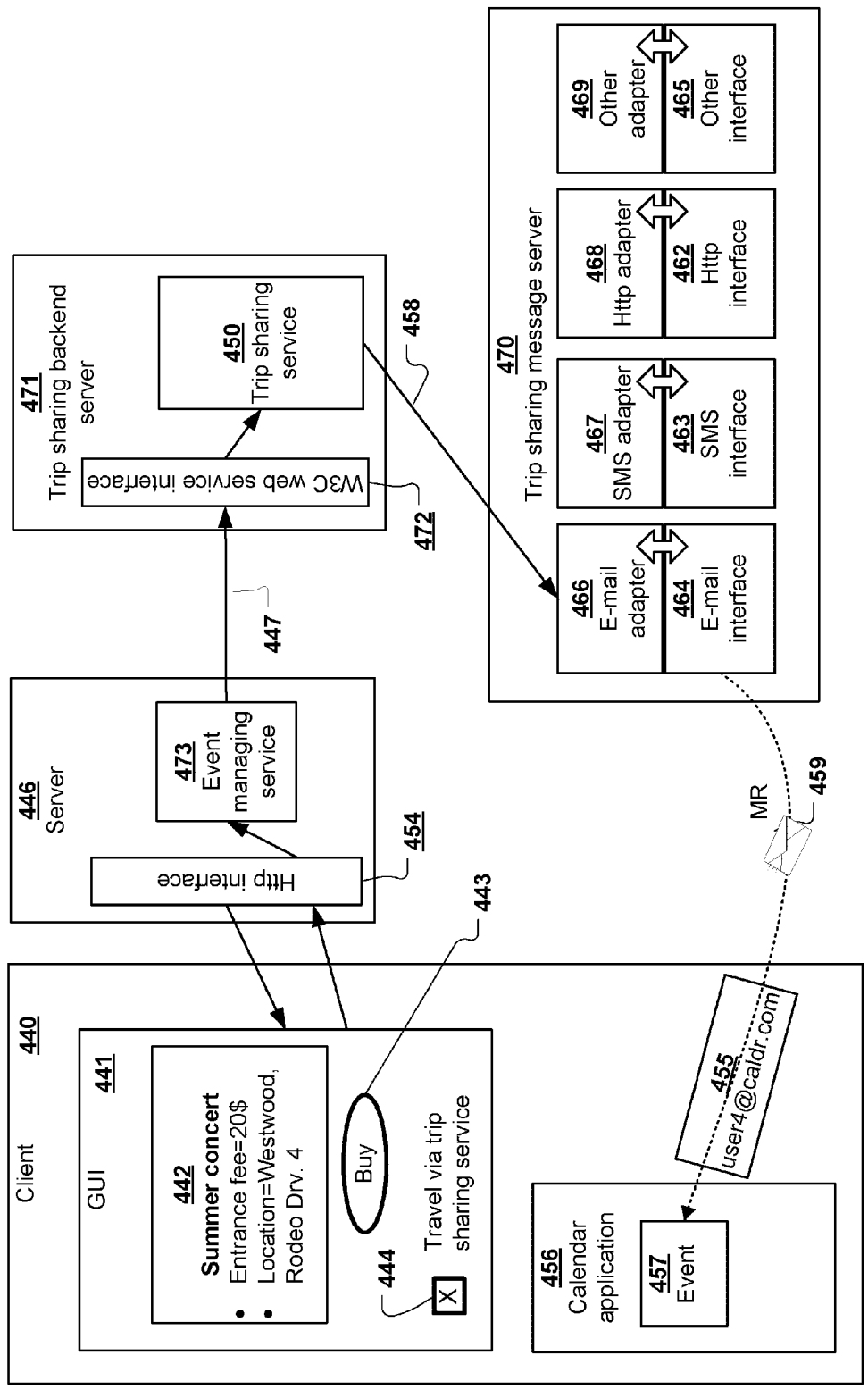
FIG. 4a illustrates a computer system of a trip sharing service called by an event managing service, the call being initiated by a user ordering a ticket.

FIG. 4a depicts the system architecture of a trip sharing service 450 according to a further embodiment of the invention, the trip sharing service being called by an event managing service 473. The embodiment of the invention according to which a trip sharing service is integrated into calendar application of is particularly beneficial in situations in which multiple users, here also referred to as customers, intend to travel to the same event. In this case, the chance is high that an appropriate driver or passenger participating in the same event can be found via a trip sharing service. According to the embodiment of the invention depicted in FIG. 4a, the execution of the trip sharing service is triggered by another service, an event managing service 473. A service request 447 is submitted to a first web service interface 472 (in this case a W3C web service interface) while the result is returned via a meeting request e-mail 459 to the calendar application of the user.

An event managing service 473 is installed on a remote server 446. The event managing service offers its customers via an interface, e.g. an Http interface, tickets for concerts and sports events. The Http interface 454 is an Html page hosted on the server 446 which is accessible via the world wide web by the customers of the event managing service. The Html page comprises an Html form which upon submission triggers the execution of the event managing service 473. The execution of the event managing service may result in the reservation or ordering of a concert ticket for a particular customer. The Http page is presented to the customer of the event managing service in the form of an Html based graphical user interface 441 by a browser installed on the client processing device 440. The client processing device, e.g. a notebook or desktop PC of the customer, is connected to the server 446 via a network, e.g. the Internet. In operation, the customer opens the Html page provided by the event managing service 473 via the browser installed on the customer's processing device 440. The customer selects the event he wants to take part in, in this case, a concert 442. The graphical user interface 441 provides the user with the option 444 o select 'travel via trip sharing service'. The option can be provided for example in the form of a checkbox or radio button. After the user presses the Html button 443, a Http request is transmitted via the network to the Http interface of the event managing service 473. The event managing service processes the request according to its particular implementation.

In case the customer selected the option 444 to travel to the concert with the assistance of the trip sharing service, the event managing service 473 submits a service request 447 to the W3C web service interface of the trip sharing service 450 hosted on the trip sharing backend server 471. The service request 447 comprises at least the information of the starting time and location of the event booked by the customer. The starting time and location of the concert represent the destination and latest acceptable arrival time. The service request 447 may in addition comprise information on the place of departure, e.g. the home or office address of the customer, which could be specified by the user via additional GUI elements on the GUI 441. The architecture of the trip sharing service 450 is depicted and explained in greater detail in FIG. 5. The trip sharing service 450 processes the service request 447 and tries to find other persons traveling at the same or a similar time to the same event like the customer ordering the ticket for the concert 442. In case at least one person having similar travel plans and congruent driving preferences, e.g. driver/passenger preferences, a result is returned to the customer ordering the concert ticket via a meeting request e-mail 459. The sending of the result is executed via a second server belonging to the trip sharing service, the trip sharing message server 470. The trip sharing message server comprises multiple interfaces and corresponding adapters, e.g. an e-mail interface 464 and an e-mail adapter 466, an SMS interface 463 and a corresponding SMS adapter 467. According to further embodiments of the invention, it is also possible that some interface/adapter pairs are hosted on a third server, e.g. in order to raise the performance of the system.

Each adapter software module 466-469 is operable to receive a result generated by the trip sharing service 450. The result is processed and formatted according to the requirements of the communication protocol used to forward the result to the client. The formatted result is then forwarded from the adapter module to its corresponding interface. For example, the result received by the SMS adapter 467 would be processed and formatted according to the requirements of an exchange of data based on SMS technology. The data would then be forwarded to the corresponding SMS interface 463, the interface 463 submitting an SMS to the mobile phone number of the customer. The data exchange between the interfaces 462-465 and their corresponding adapter modules is illustrated with double arrows. The result generated by the trip sharing service 450 can be returned 458 via many different communication technologies (SMS, W3C web services, e-mail), because the result can be is transformed with the help of an appropriate adapter software module according to the data exchange format used to forward the result to the user/the client machine 440. While the adapter components comprise program routines for data exchange with the trip sharing service 450 hosted on the trip sharing backend server 471, the interfaces 462-465 and the W3C web service interface 472 can be used for the data exchange with a client machine 440.

According to the embodiment depicted in FIG. 4a, the service request 447 may comprise an additional information that the result generated by the trip sharing service is to be returned to the customer via a meeting request e-mail. This information could also be contained in the user profile data of the customer available to the trip sharing service 450. In case the trip sharing service 450 was able to detect an appropriate trip accompany, the result 458 is returned to the e-mail adapter 466 hosted on the trip sharing message server 470. The data contained in the result 458 is extracted and used by the e-mail adapter 466 to specify a meeting request e-mail. The e-mail is returned via the e-mail interface 464 to the e-mail address 455 of the customer. The information on the customer's e-mail address 455 may, for example, be submitted as part of the service request 447.

Depending on the customer's preferences and on the type of the client device 440, the trip sharing service result could alternatively have been delivered to the customer via SMS or a W3C web service interface, the result being formatted according to the selected interface by the corresponding adapter.

According to a further embodiment of the invention, the user can specify, e.g. in his user profile, that the result generated by the called service shall be returned via different second interfaces depending on the time span that is left between the generation of the result (a trip event associated with at least one matching user profile) and the begin of the trip event. For example, the user can specify to receive the result via an e-mail interface one day before the trip starts. In addition, or alternatively, the user can specify that the server should return the result per SMS one hour before the trip starts.

According to a further embodiment of the invention, the trip sharing service 450 comprises a registry. The registry is a data structure mapping a particular service request of a client to a particular adapter module 466-469. The registry in addition comprises information required to send the result to the client according to the preferred interface, e.g. a mobile phone number for the SMS adapter or an e-mail address for the e-mail adapter. Upon receipt of a service request by the service 450, the service is mapped to a particular adapter module by specifying a new entry in the registry connecting the request with a preferred adapter module. After the service 450 has finished processing the service request, the generated result is returned via push technology to the adapter module mapped to the service request. The adapter module hosted on the trip sharing message server receives the result, generates a message according to the communication technology supported by the adapter module and forwards the result to its corresponding interface. The interface returns the result to the client, e.g. via an SMS or an e-mail.

Figure 4B:
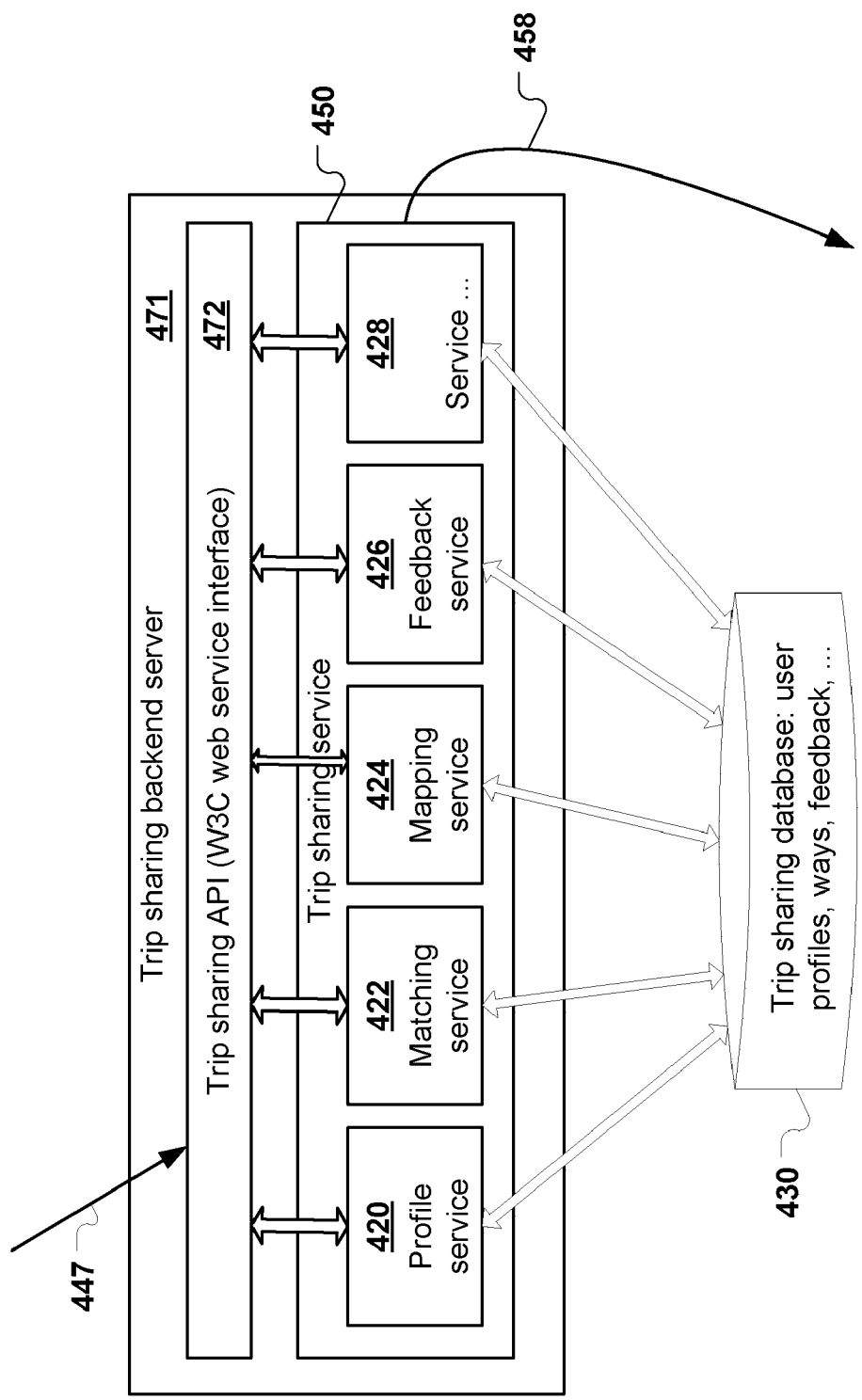
FIG. 4b illustrates a computer system of the trip sharing service hosted on a trip sharing backend server in greater detail.

FIG. 4b depicts the architecture of the trip sharing service 450 hosted on the trip sharing backend server 471 in greater detail. The trip sharing service comprises multiple service modules 420-428, the backend server being accessible via a trip sharing W3C web service API 472. The services 420-428 have access to a trip sharing database 430 comprising user profiles, ways, feedback information provided by trip sharing service users and other trip sharing related information.

A service request 447 is sent to the trip sharing service 450 via the service's W3C web service interface 472. The service request may be received directly from a client machine 440, a server 446 hosting a different service or from the trip service messaging server receiving a service request from a client e.g. via its e-mail interface or SMS interface (not shown). The service request comprises departure and arrival time of the trip, starting point and destination and may also comprise additional parameters, e.g. tag mapping information. The service request 447 may, for example, be specified by the user of the calendar application 152 manually via a service specific plug-in providing a GUI or may have been submitted (semi-) automatically upon prediction of a required trip event by a service integration module 157 (not shown) or via a remote required event prediction service (not shown). The service request 447 comprises the starting time and location of an event, e.g. the concert booked by the customer. The service request also contains the e-mail address of the customer 455. The location may be encoded as complete and unequivocal address or as user specific tag which can be mapped to an unequivocal address by the service 450. The service request in addition contains information on the location from which the customer plans to start his trip to the concert.

All relevant information is extracted from the service request 447. At first, a profile service is invoked for assigning a user profile to the service request. The profile service has access to the database 430 comprising, among other data, also user profiles. A user profile 561 may comprise multiple attributes, e.g. the real name of the user 556, his date of birth 557, his e-mail address 558, and may also comprise mapping information 559 and additional parameters 560 specifying e.g. driver/passenger preferences of the user.

Figure 5:
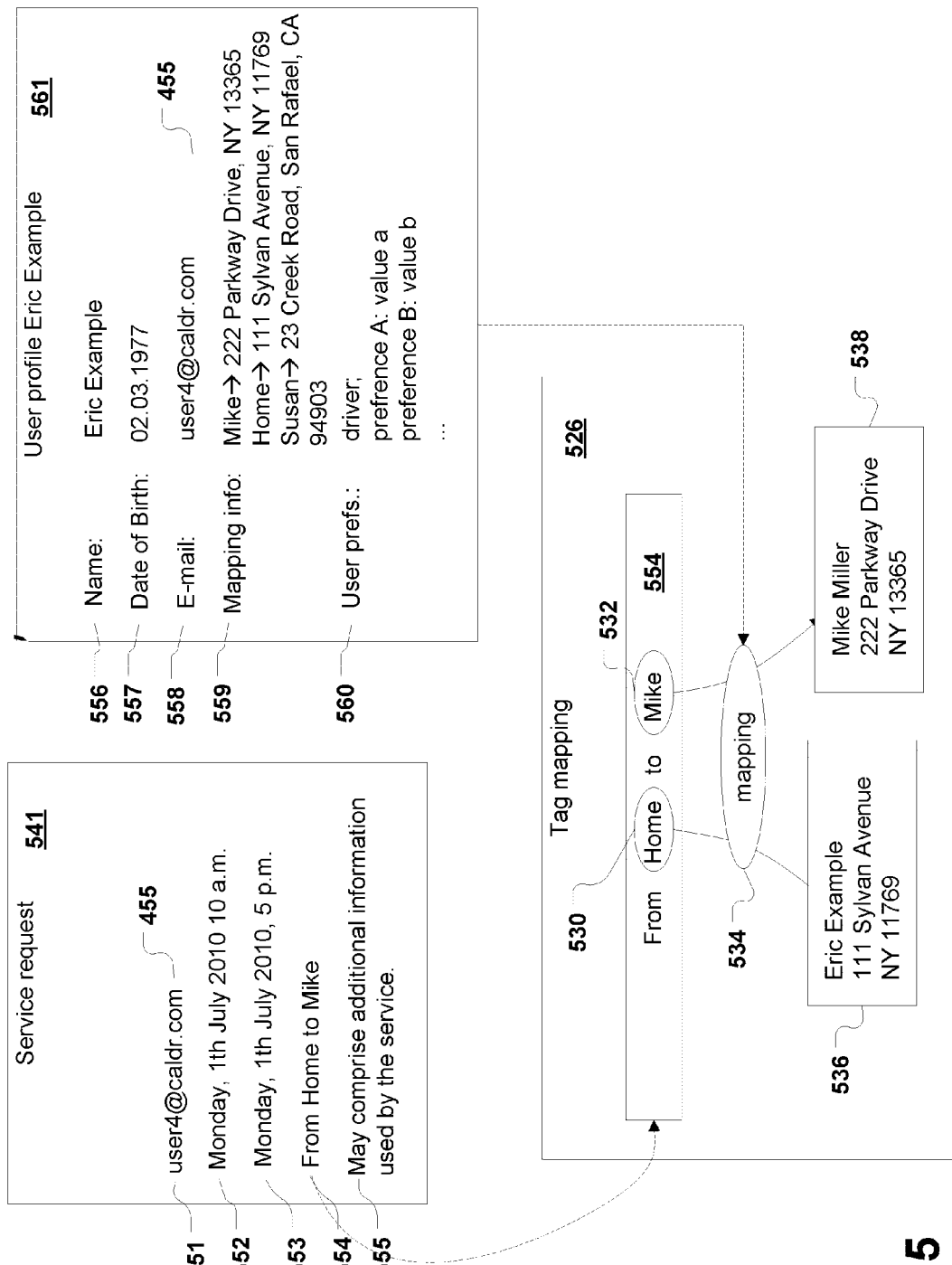
FIG. 5 depicts the mapping of tags contained within a service request to unequivocal addresses as specified in a user profile.

The profile service 420 searches for the user profile stored in the database 430. The search concentrates on the e-mail address attribute 558 of the user profile in order to map a user profile to the service request based on identity of the e-mail address of the user profile 558 and the customer's e-mail address 551 specified in the service request. The data contained in a service request sent to the trip sharing service and the data contained in each user profile according to one embodiment of the invention is illustrated in detail in FIG. 5. If an appropriate user profile 561 was found by the profile service, mapping information 559 contained in this user profile is retrieved and used during the execution of the mapping service 424. The mapping service maps ambiguous tags 530, 532 within the service request to unequivocal addresses 536, 538 (FIG. 5). There exist generally available tags, e.g. 'Home' or 'Work', but also user-specific tags, e.g. 'Mike' or 'Supermarket'. These tags are automatically replaced by user specific, complete addresses as specified in the mapping schema 559 of the user profile. The two addresses 536 and 538 define the starting point and destination of the trip. In addition, external services such as Google Maps may be used to derive the of those addresses or to derive street maps depicting the route of the shared trip.

According to a further embodiment of the invention, the service request 447 may comprise additional mapping information 555 overwriting the tag mapping schema 559 of the user profile. For example, the tag 'Work' may be mapped according to the specification in a user's profile to a particular address. Three days in a year the employee works in a different dependence of his company. Instead of changing the mapping information of his user profile, the employee during those three days may simply add additional mapping information to his service requests sent to the trip sharing service, the additional information mapping 'Work' to a different address. The additional mapping information could, for example, be submitted via the GUI of a service integration module for the trip sharing service installed on the client machine. After retrieving the unequivocal addresses for the location tags, a route is calculated to get by car from the starting point to the destination. According to a further embodiment of the invention, the route calculation may be executed by a third party service, e.g. Google maps. The route can be used by the service to calculate the time the trip via the predicted route will probably take.

After the execution 534 of the mapping service 424, a matching service 422 is executed. Based on the calculated route and additional parameters contained in the user's profile or the service request 541, the mapping service of the trip sharing service searches for users having associated preferences being congruent with the preferences specified in the service request 541 and the sender's user profile 561 and who plan to travel the same route or a part of the same route within the time window defined by the starting time (the earliest acceptable starting time for the user) and the arrival time (the latest acceptable arrival time for the user) as specified in service request 541. In addition, the matching service checks if the profile of the user submitting the service request 541 and the profile of a potential trip accompany match regarding their trip specifications and preferences 560, e.g. regarding their driver/passenger preferences. In case one or multiple matching user profiles are detected in the database 430, the best matching profiles are assigned automatically to the trip. The result comprising the best matching user profiles is sent according to the depicted use case scenario via a second order service request 458 to the e-mail adapter component hosted on the trip sharing message server 470. The Email adapter 466 creates a meeting request e-mail with the e-mail address of the customer in the recipients field. The MR e-mail is sent to the customers e-mail address 455 by the E-mail interface 464, resulting in an update of the electronic calendar of the customer. The updated calendar comprises a new trip event characterized by a starting and arrival time, the location of the concert and user profile data of one or multiple matching trip accompanies.

According to a further embodiment of the invention, the user profile database of the trip sharing service is operable to be populated via an automated import of user profiles of various social networks, e.g. Facebook, via an import of lists of employee profiles of a company, via an import of LDAP directories or an import of user profiles stored according to any other data format. The import is executed by software modules being operable to read the user profiles from a source data repository and to store them to the user profile database 430 of the trip sharing service. This feature is advantageous, as the user specific settings used in the matching procedure of the trip sharing service may comprise the option for a preferential matching of users being member of the same social network or company. If a company uses the trip sharing service to reduce expenses, preferentially employees from the same company will be matched by the matching service 422. Only in case there are car seats left which cannot be assigned to employees of the same company, persons outside the company may be accepted by the matching service in this scenario.

FIG. 5 depicts the data comprised in a service request 541 sent to the trip sharing service according to one embodiment of the invention. In addition, the figure depicts data that is comprised by a user profile 561 of the trip sharing service and illustrates how this data can be used by the trip sharing service for tag mapping 526. The service request and user profile data of other embodiments of the invention may comprise data on another set of features. The service request 541 according to one embodiment of the invention comprises the e-mail address 551 of the user submitting the service request (455). The service request in addition contains the earliest acceptable starting time 552 of the user and the latest acceptable arrival time 553. The request in addition comprises a human and machine-readable set of terms 554 used by the service to determine the place of departure and the destination. The service request may in addition comprise further data, e.g. user preferences overwriting user preferences specified in the user profile solely for the execution of this particular service request 541. The user profile 561 comprises the name 556 of the user, the date of birth 557, the user's e-mail address 558, tag mapping information 559 and user specific preferences 560. In the preferences, the user may specify e.g. his driver/passenger preferences.

In operation, the trip sharing service allocates a user profile 561 and the data contained therein to a service request 541, e.g. via the user's e-mail address 455 being specified in the service request as well as in the user profile. The mapping of a user profile to a service request enables the mapping of user specific ambiguous location tags such as 'Home' 530 or 'Mike' 532 to unequivocal addresses 536 and 538 according to the tag mapping information 559 of the user profile.

Figure 6:
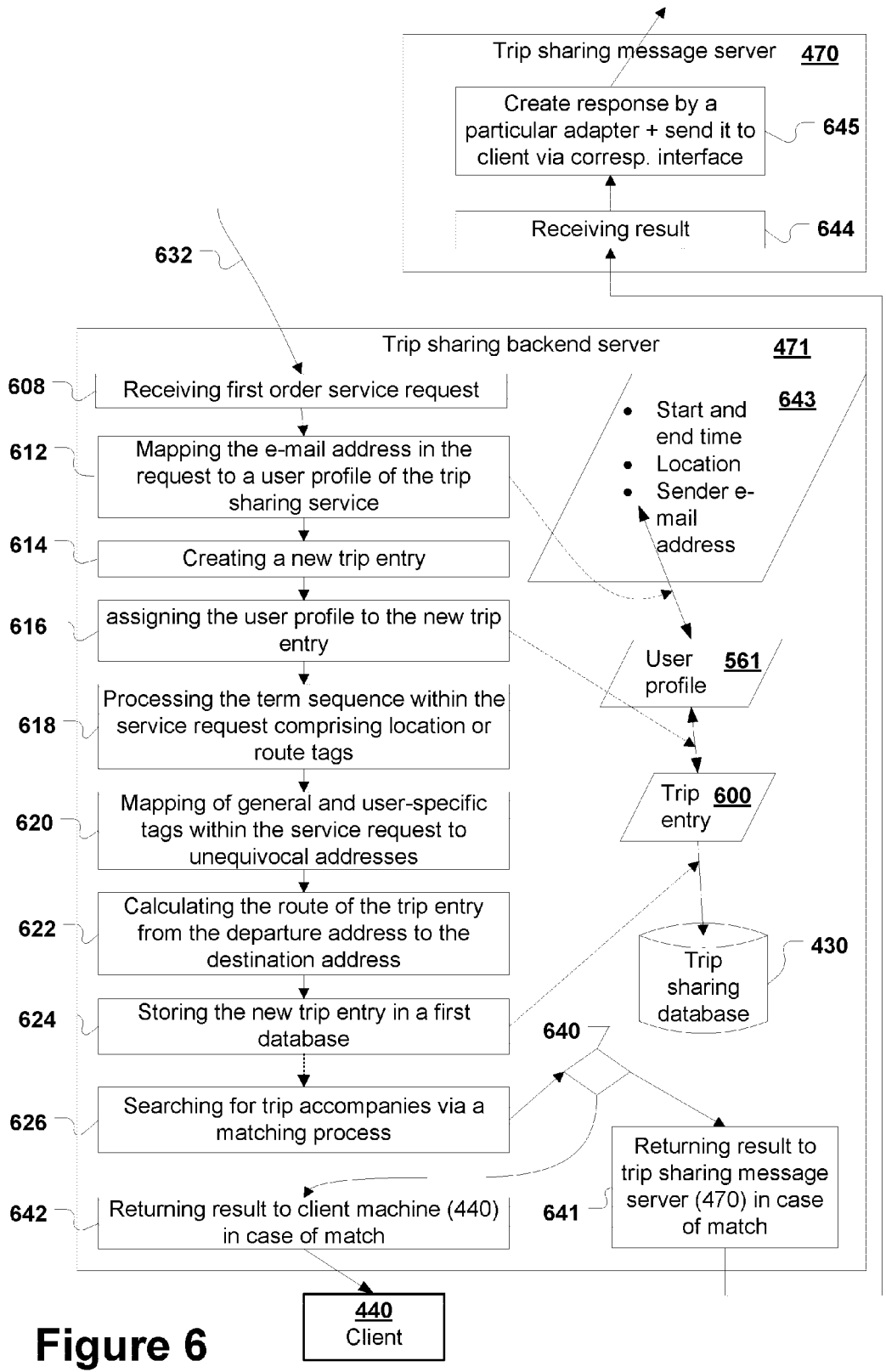
FIG. 6 is a flow chart illustrating the steps of predicting required routes by a trip sharing service.

FIG. 6 is a flow chart illustrating the steps executed by the profile, mapping and matching service of the trip sharing service 450 hosted on the trip sharing backend server 471 and some steps executed on the trip sharing message server 470 according to a further embodiment of the trip sharing service in greater detail.

Steps executed on the trip sharing backend server 471:
1. Receiving in step 608 a first order service request 632 sent to the W3C web service API of the trip sharing service 450, the request comprising start location, destination, earliest acceptable departure time, latest acceptable arrival time, the location being specified by location tags. The service request may in addition comprise user specific settings for a planned trip and additional user preferences.
2. In step 612 the e-mail address 455 and other data 643 being contained in the service request is mapped to a user profile 561 of a user registered for the trip service having the same e-mail address, the mapping being executed by the profiles service.
3. Creating in step 614 a new trip entry, wherein the trip entry is a data object representing a trip.
4. Assigning in step 616 the user profile 561 to the new trip entry 600.
5. Processing in step 618 the content of the service request in order to determine location or route tags being further processed by the mapping service.
6. Mapping in step 620 general and user-specific location tags within the text content to unequivocal addresses. In case the service request comprises route tags, the route tags are mapped to unequivocal routes.
7. Calculating in step 622 the route of the trip entry from the departure address to the destination address.
8. Storing in step 624 the trip entry to the trip sharing service database 430.
9. Searching in step 626 for one or multiple appropriate trip accompanies via a matching of user profile preferences and trip, wherein the matching checks at least the congruency of driving preferences (driver/passenger preferences) and trip preferences (matching time windows and routes).
10. Depending on the specifications of the service request or on user profile settings 561, the result comprising data on a possible trip and associated trip accompanies can be sent to different recipients via different communication interfaces (decision 640). In case the service request was submitted by a service integration plug-in installed on the client machine 440 and in case the plug-in is operable to process the result obtained via the W3C web service interface 472, the result can be returned to the client machine via the same interface 472 in step 642 in a synchronous or asynchronous way. The plug-in now creates a new trip event or modifies an existing trip event based on the data of the received result. In case the service request 632 was sent via a third party service 473 or via an adapter of the trip sharing message server 470, the result is sent to an appropriate adapter 466-469 hosted on the server 470 in step 641. Said plug-in or other implementation form of the service integration module may alternatively be installed on a computer hosting the groupware server of the calendar application (not shown).

Steps Executed on the Trip Sharing Message Server 470:
1. In case the decision 640 results in the execution of step 641, step 644 is executed on the message server: an adapter taken from the set of adapters 466-469 receives the result generated by the trip service backend server.
2. In step 645, the adapter of step 644 extracts relevant data and creates a response. The response is formatted and specified according to the communication technology used for transferring the result to the client. The interface corresponding to the adapter receiving the result from the trip sharing backend server finally returns the result to the service integration module installed on the client. For example, if the result generated by the backend server is received by the SMS adapter 467, the result is processed by the SMS adapter and transferred to the client as SMS via the SMS interface 463.

Figure 7:
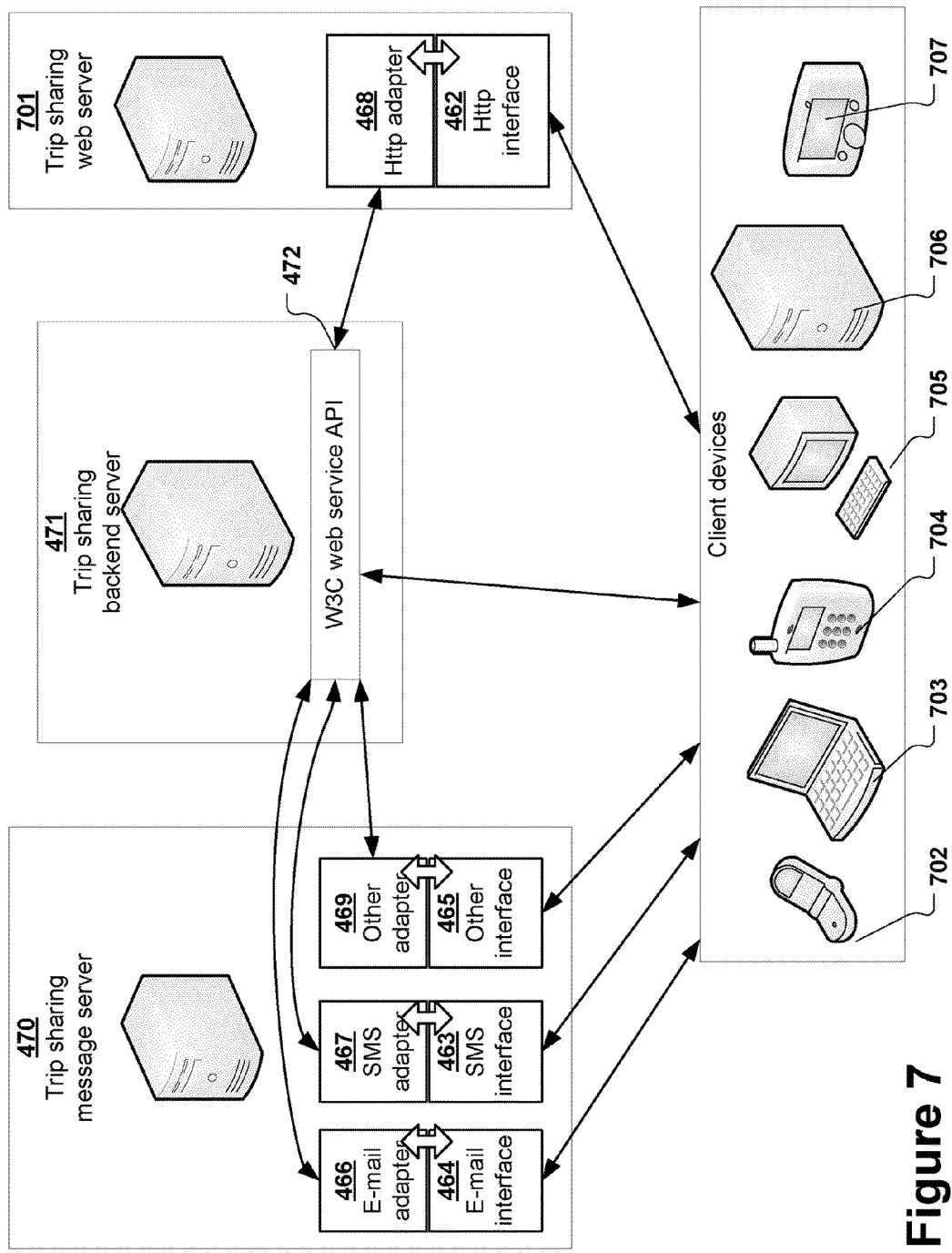
FIG. 7 depicts sets of embodiments of end user devices being able to call via an service integration module the trip sharing service directly or indirectly via multiple interfaces in accordance with the invention.

FIG. 7 depicts sets of possible end user devices having installed a calendar application and being able to call the trip sharing service 450 hosted on the trip sharing backend server directly or indirectly via multiple interfaces according to one embodiment of the invention. Possible client devices comprise, but are not limited to, mobile phones 704, processing devices such as notebooks 703, desktop PCs 705 or third party servers 706, navigation devices 707 or smart phones 702. The navigation device 707 may be a mobile phone having installed a calendar application and in addition comprising a software component providing GPS based navigation assistance. The client devices, provided they are able to communicate via a W3C web service interface, can submit service requests to the W3C web service API 472 of the trip sharing service hosted on the trip sharing backend server 471 directly and process the result returned by this interface 472. In said use case scenario, the interface for submitting the service request and for receiving the result is the same. The submission of the service request to the first web service interface and the receipt of the response via the first or a second web service interface can be implemented as synchronous or asynchronous data exchange.

According to a further embodiment of the invention, the service request may be sent at first to an interface hosted on the trip sharing message server 470 or the trip sharing web server 701. The trip sharing web server 701 hosting an Http interface 462 and an Http adapter 468 fulfils an equivalent function like the trip sharing message server 470 hosting adapters and interfaces supporting the data exchange between the backend server and the client via other communication technologies, e.g. SMS or e-mail. Not every client device 702-707 may be able to communicate via all communication interfaces 462-465, 472 provided by the trip sharing service.

Any service, for example the trip sharing service hosted on server 471, can be integrated into a calendar application running on any of the user devices 702-707 by installing a service integration module 157 on any of those devices, the module 157 being operable to submit a service request to at least one of the interfaces 462-465, 472 for accessing the trip sharing service.

Some exemplary and in no way limiting use case scenarios are:

A service request is submitted from a service integration module installed on notebook 703 to interface 472. In case a matching trip accompany could be found by the trip sharing service 450, the result is returned via the same interface 472 to the service integration module 157. The service integration module 157 creates or modifies a corresponding event in the calendar.

A service request is submitted from a service integration module installed on notebook 703 to interface 472. According to the settings of the user's profile available to the trip sharing service, the user prefers to receive the result of the service via e-mail. In case a matching trip accompany could be found by the service 450, the result is returned to the e-mail adapter 466 hosted on the trip sharing message server 470. The e-mail adapter 466 creates a meeting request e-mail which is sent to the calendar application installed on the client 703. In the calendar application, an event corresponding to the result generated by the trip sharing server is created.

A service request is submitted from a service integration module installed on a mobile phone 704 to interface 463 via an SMS. According to the settings of the user's profile available to the trip sharing service, the user prefers to receive the result of the service via e-mail. In case a matching trip accompany could be found by the service, the result is returned to the e-mail adapter 466 hosted on the trip sharing message server 470. The e-mail adapter 466 creates a meeting request e-mail which is sent to the calendar application installed on the client 703 via the e-mail interface 464. In the calendar application, an event corresponding to the result generated by the trip sharing server is created.

A web site comprising a graphical user interface is provided by the trip sharing web server 701. The user may specify a service request directed to the trip sharing service 450 via the submission of a Html form filled with user specific data on a planned trip. The Http based service request is sent to the Http interface 462 hosted on the server 701. The Http interface creates a second order service request submitted to the W3C web service API 472 of the trip sharing backend server 471. According to the settings of the user's profile available to the trip sharing service, the user prefers to receive the result of the service via e-mail. In case a matching trip accompany could be found by the service, the result is returned to the e-mail adapter 466 hosted on the trip sharing message server 470. The e-mail adapter 466 creates a meeting request e-mail which is sent to the calendar application installed on the client 703 via the e-mail interface 464. In the calendar application, an event corresponding to the result generated by the trip sharing server is created.

The features described with reference to particular embodiments can freely be combined depending on the requirements of a particular service to be integrated. The main purpose of the service integration module according to a preferred embodiment of the invention is to integrate a service into a calendar application. Additional benefits provided by the service integration module may comprise the automated detection of required service requests or the facilitation of the entry and specification of a service request via a GUI. Features such as the mapping of tags to unequivocal addresses are highly beneficial in the context of services helping to organize trips but may be unnecessary in case a different service is integrated. Other service integration modules designed to integrate other services may therefore comprise other or additional program routines assisting in the seamless integration of service they are designed to help integrating.

The event being specified in the electronic calendar upon the receipt of a meeting request e-mail by the calendar application or upon the receipt of the service result by the service integration plug-in can be a singular or a recurring event. This statement holds true for each described embodiment of the invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

Figure 8:
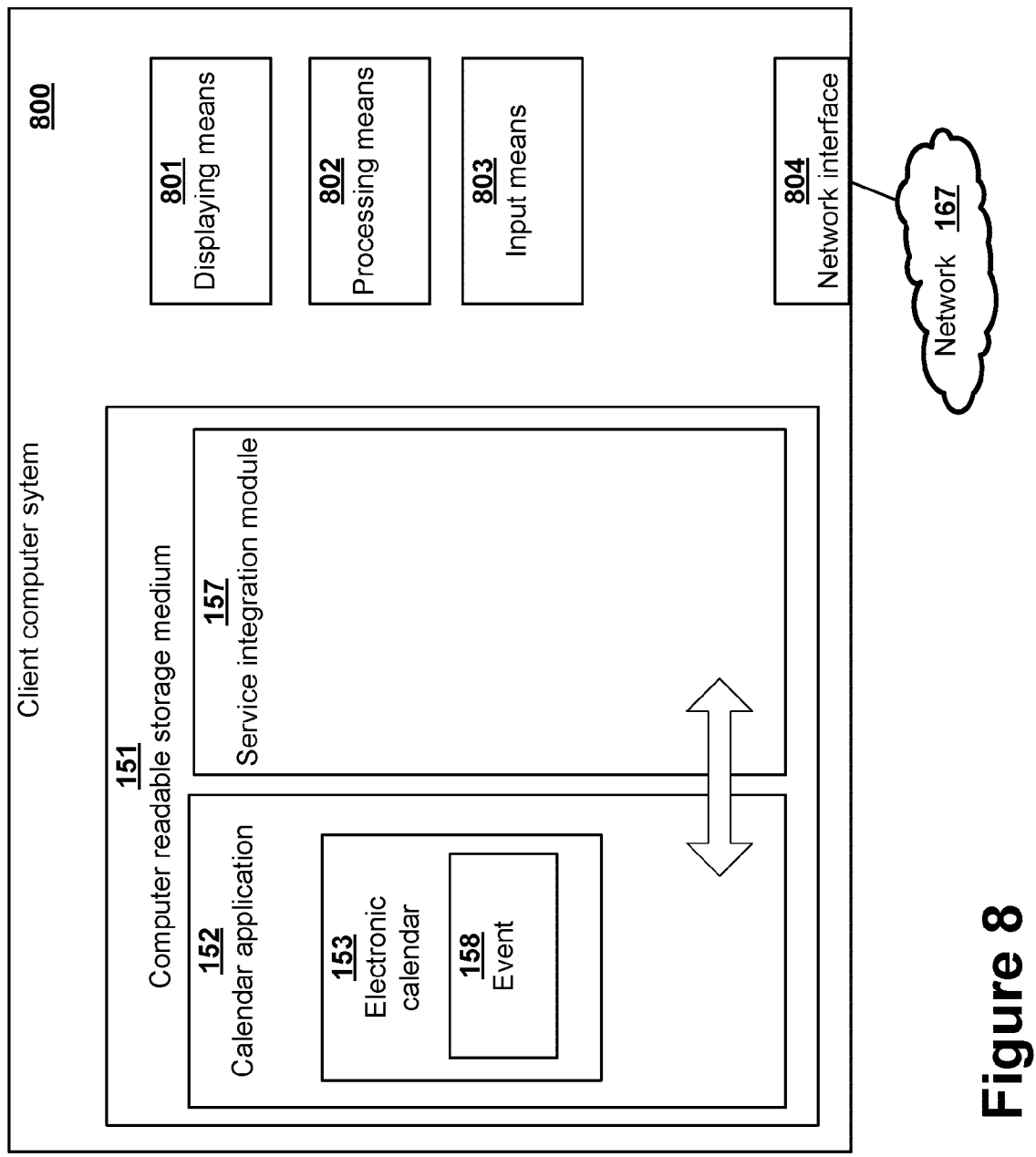
FIG. 8 depicts a client computer system comprising a storage with instructions for executing a calendar application and a service integration module.

FIG. 8 depicts a client computer system 800 according to one embodiment of the invention comprising a computer readable storage medium 151. The storage medium 151 comprises program instruction for executing a calendar application 152 and a service integration module 157, the service integration module being interoperable with the calendar application. The computer system 800 further comprises displaying means 801, e.g. a CRT monitor, a TFT screen or a touch screen. The processing means are operable to interpret the program instructions stored to the computer readable storage medium 151, resulting in the execution of the calendar application and the service integration module. The system further comprises Input means, e.g. a mouse, keyboard, a voice recognition interface or a touchscreen or touchpad. The input means receive input data provided by the user and forwards the data to the service integration module and the calendar application. The network interface 804 is operable to establish a network connection. The network interface can be an Ethernet card, a WLAN adapter, an adapter for exchanging information via a satellite or fiberglass, a mobile phone adapter for exchanging data e.g. via SMS or other technical means fulfilling equivalent functions and provide access to the Internet or enable the transmission of information to other mobile or immobile processing devices.

According to a further embodiment of the invention, the client device is a mobile processing device, for example a mobile phone, a smart phone, a blackberry, an iPhone, a notebook or netbook comprising a mobile phone adapter or any equivalent mobile device. Said mobile processing device, also referred to as 'mobile device', comprises means to exchange data with other mobile or immobile processing devices. The means for exchanging data may be available permanently or temporarily. In operation, they provide access to the Internet or provide access to other data transfer technologies and systems. For example, the means for exchanging data can provide the mobile device with the function to exchange data with other processing devices via SMS, via instant messaging technology. The data exchange can be based on various different Protocols, for example Http, XMPP/Jabber and others.

ABBREVIATIONS

API Application Programming Interface
CalDAV Calendaring Extensions to WebDAVGPS Global Positioning System
LAN Local Area Network
LDAP Lightweight Directory Access Protocol
MR Meeting Request
MRR Meeting Request Response
UDDI Universal Description, Discovery and Integration
UR Update Request
SR Service Request
XMPP Extensible Messaging and Presence Protocol formerly named Jabber
W3C World Wide Web Consortium
WAN Wide Area Network
WebDAV Web-based Distributed Authoring and Versioning

LIST OF REFERENCE NUMERALS

150 client machine
151 computer readable storage medium
152 calendar application
153 electronic calendar
154 first web service interface
155 server
156 service
157 service integration module
158 calendar event (data object)
159 step
160 step
161 step
162 step
163 step
164 step
165 step
166 step
167 network
168 web service interface (not an e-mail interface)
234 step
240 second web service interface being an e-mail interface
241 e-mail address of user of calendar application 152
242 step
330 computer readable storage medium
331 step
334 step
335 service request
336 event (data object)
337 new event (data object)
338 predicted required event (data object)
420 profile service
422 matching service
424 mapping service
426 feedback service
428 other service
440 client device
441 GUI
442 concert event
443 'Buy' button
444 checkbox
446 server
447 service request
450 trip sharing service
454 Http interface
456 calendar application
457 event (data object)
455 e-mail address of customer of event managing service 469
458 returned result
459 meeting request e-mail
462 http interface
463 SMS interface
464 e-mail interface
465 other interface
466 e-mail adapter
467 SMS adapter
468 Http adapter
469 other adapter
470 trip sharing message server
471 trip sharing backend server
472 W3C web service interface
473 event managing service
526 tag mapping process
530 location tag
532 location tag
534 tag mapping step
536 unequivocal address
538 unequivocal address
550 service request
551 e-mail address of user submitting service address
552 starting time
553 arrival time
554 sequence of terms optionally comprising tags
555 additional data 556 real name of user
557 date of birth
558 e-mail address of user
559 tag mapping information
560 user preferences
561 user profile
600 trip entry (data object)
608 step
612 step
614 step
616 step
618 step
620 step
622 step
643 service request associated information
644 step
645 step
701 trip sharing web server
702 smart phone
703 notebook
704 mobile phone
705 desktop computer
706 third party server
707 navigation device
800 client computer system
801 displaying means
802 processing means
803 input means
804 network interface

What is claimed is:

1. A non-transitory computer readable storage medium having stored therein instructions executable by a processor, the instructions being implemented by a service integration module, the instructions, when executed by the processor, integrate a service in a calendar application and cause the processor to:
submitting a service request to a remote service by the service integration module, the service integration module having read and write access to the calendar application, the service integration module and the calendar application being interoperable with each other and installed on a client computing device, the service request being a call of a first web service interface of the service, the call of the first web service interface initiating the execution of the service and the generation of at least one result;
receiving the at least one result by the service integration module via the first web service interface provided by the service;
processing the result by the service integration module, the service integration module being an event listener for a calendar event, the processing comprising extracting data required for specifying a calendar event in an electronic calendar of the calendar application from the result, the event being taken from the group consisting of singular events and recurring events, the recurring events being events with a particular recurrence pattern, the event being a data object in an electronic calendar of the calendar application; and
updating, a calendar event of the electronic calendar of the calendar application, the updating comprising the execution of updating steps, the updating steps being taken from a group of steps consisting of creating, deleting and modifying the calendar event in the electronic calendar of the calendar application by the service integration module in response to receiving the at least one result.

2. The non-transitory computer readable storage medium according to claim 1,
wherein processing the result by the service integration module comprises extracting data required for specifying multiple events in an electronic calendar from the result; and
wherein the set of updating steps consists of creating, deleting and modifying multiple events in the electronic calendar of the calendar application by the service integration module.

3. The non-transitory computer readable storage medium according to claim 1, wherein the at least one result is received by the service integration module via a second web service interface provided by the service.

4. The non-transitory computer readable storage medium according to claim 1, wherein the service integration module is in addition operable to automatically predict a required calendar event by:
analyzing the events within the electronic calendar;
predicting and specifying at least one required event;
assigning the at least one predicted required event additional data required by the service for execution;
submitting a service request to the first web service interface of a remote service, the service request comprising the data of the predicted required event, the call of the first web service interface initiating the execution of the service and the generation of at least one result;
and wherein the service integration module is a software program being interoperable with the calendar program, the service integration module being selected from the group consisting of:
a software implemented as 'plug-in' for the calendar application;
an independent service program being registered as event listener with a calendar event; and
an independent service program searching the calendar application for new calendar entries on a regular basis.

5. The non-transitory computer readable storage medium according to claim 1, wherein the service integration module is installed on a computer having installed a groupware server of the calendar application, the service integration module having read and write access to the data managed by the group ware server and wherein the service integration module is a software program being interoperable with the groupware server managing the electronic calendar of at least one calendar application, the service integration module being selected from the group consisting of:
a software implemented as 'plug-in' for the group ware server of the calendar application;
an independent service program being registered as event listener with a calendar event of the group ware server of the calendar application; and
an independent service program searching the events of the at least one electronic calendar managed by the groupware server of a calendar application for new calendar entries on a regular basis.

6. The non-transitory computer readable storage medium according to claim 5 comprising additional instructions, which when executed by the processor, cause the processor to:
receiving the at least one result via a web service interface of the service by the service integration module, the web service interface being taken from the group consisting of the first web service interface and a second web service interface;
processing the result by the service integration module, the processing comprising extracting data from the result required for specifying an event of an electronic calendar of the calendar application; and updating the electronic calendar of the calendar application, the updating comprising the execution of updating steps, the updating steps being taken from a group of steps consisting of creating, deleting and modifying an event in the electronic calendar of the calendar application by the service integration module in response to receiving the at least one result.

7. The non-transitory computer readable storage medium according to claim 1,
wherein the service integration module is a software program being interoperable with the calendar program and being selected from the group consisting of:
a software implemented as 'plug-in' for the calendar application, and
an independent service program searching the calendar application for new calendar entries on a regular basis.

8. The non-transitory computer readable storage medium according to claim 1, wherein the requested service is operable to map general and user-specific tags within text of the service request to unequivocal addresses, the mapping information being derived from the group consisting of tag mapping information of a user profile and tag mapping information contained within the service request.

9. The non-transitory computer readable storage medium according to claim 1, wherein the service integration module provides the user with a graphical user interface GUI, the GUI providing the user with graphical user interface elements to specify a service request.

10. The non-transitory computer readable storage medium according to claim 9, wherein the processing step and the set of updating steps executed by the service integration module comprise a set of sub-steps, the set of sub-steps comprising:
extracting a first set of parameters from the result returned from the service;
processing the first set of parameters, the processing resulting in the generation of at least one intermediate result;
displaying at least one intermediate result to the user in the GUI of the service integration module, the at least one intermediate result being selectable by the user;
submitting a second service request to the service, the second service request comprising at least one selected intermediate result, the second service request resulting in a second processing step executed by the service, the service generating at least one second result;
receiving the at least one second result by the service integration module;
processing the second result by the service integration module, the processing comprising extracting data required for specifying an event in an electronic calendar of the calendar application from the second result; and
updating the electronic calendar of the calendar application, the updating comprising the execution of updating steps, the updating steps being taken from the group of steps consisting of creating, deleting and modifying an event in the electronic calendar of the calendar application by the service integration module in response to receiving the second result.

11. A non-transitory computer readable storage medium having stored therein instructions executable by a processor, the instructions being implemented by a service integration module, the instructions, when executed by the processor, integrate a service in a calendar application and cause the processor to:
submitting a service request to a remote service by the service integration module, the service integration module having read and write access to a calendar application, the service integration module and the calendar application being interoperable with each other and installed on a client computing device, the service integration module being an event listener for a calendar event, the service request being a call of a first web service interface of the service, the call of the first web service interface initiating the execution of the service and the generation of at least one result, the at least one result being used for creating a meeting request e-mail, the meeting request e-mail comprising data of the result, the meeting request e-mail being sent to the e-mail address of a user of the calendar application;
receiving the meeting request e-mail by the calendar application;
creating a calendar event corresponding to the received meeting request e-mail in the electronic calendar of the calendar application upon receipt of the meeting request e-mail by the calendar application, the calendar event being taken from the group consisting of singular events and recurring events, the recurring events being events with a particular recurrence pattern, the event being a data object in an electronic calendar of the calendar application.

12. A computer implemented method, comprising:
receiving by a service via a first web service interface of the service a service request submitted by a service integration module, the service integration module having read and write access to a calendar application, the service integration module and the calendar application being interoperable with each other and installed on a user computing device, the service integration module being an event listener for a calendar event, the calendar application being used by a user;
executing the service, the execution being initiated in response to the receipt of the service request;
returning at least one result by performing a return step, the return step being selected from the group consisting of:
returning the result to the service integration module via the first web service interface of the service;
returning the result to the service integration module via a second web service interface of the service, wherein the second interface is not an e-mail interface;
returning the result to the service integration module via a second web service interface of the service, wherein the second interface is an e-mail interface and the result is returned in the form of a meeting request e-mail;
wherein the returned result comprises data specifying a calendar event in an electronic calendar.

13. The computer implemented method according to claim 12,
wherein the service request comprises trip related information, the trip related information comprising at least:
one tag representing the place of departure,
one tag representing the destination,
a starting time and an ending time, the starting and ending time specifying a time window within which the user is willing to take a trip;
wherein the requested service is a trip sharing service, the execution of the trip sharing service comprising the steps of:
extracting at least the trip related information from the service request;
mapping the request to a user profile of the trip sharing service;
creating a new trip entry;

assigning the user profile to the new trip entry;
mapping general and user-specific tags within the request to unequivocal addresses, the user-specific mapping information being derived from the user-profile, wherein the departure and destination addresses are derived from the tags representing the place of departure and the destination;
calculating a route from the departure address to the destination address and assigning the route and the time window for taking the trip to the trip entry;
storing the new trip entry in a first database; and
searching for appropriate trip accompanies, the appropriateness depending on matching parameters specified in the user profiles and on matching parameters specified in the service request, the matching parameters comprising at least the driver/passenger preference of the user, matching time windows for taking the trip and matching route sections;
returning the result, the result comprising trip information, the trip information comprising a route, a departure time, an arrival time and user profile data of one or multiple trip accompanies.

14. The computer implemented method according to claim 13, wherein the user profiles available for the service being selected from the group consisting of social communities, employee profiles of companies, LDAP directories and user profile lists.

15. The computer implemented method according to claim 13, wherein the requested service is operable to map tags within text of the service request to unequivocal routes, the mapping information being derived from the group consisting of tag mapping information of a user profile and tag mapping information contained within the service request.

16. The computer implemented method according to claim 13, wherein the service receives a request from an event managing service hosted on a remote server, the event managing service providing via a graphical user interface its customers the option to book tickets, the graphical user interface providing the customer in addition with the option to select the trip sharing service for traveling to the booked event, wherein the selection of this trip sharing service option results in the submission of a service request to the trip sharing service, the service request comprising at least the e-mail address of the customer and the starting time and location of the booked event, and wherein at least one result generated during the execution of the trip sharing service is sent as meeting request e-mail to the customers e-mail address.

17. A computer system comprising:
a storage medium having installed a calendar application and a service integration module, the service integration module having read and write access to the calendar application, the service integration module comprising instructions, the instructions when executed by a processor cause the processor to perform a method for integrating a service in the calendar application, the method comprising:
submitting a service request to a remote service by the service integration module, the service integration module having read and write access to the calendar application, the service integration module and the calendar application being interoperable with each other and installed on a client computing device, the service request being a call of a first web service interface of the service, the call of the first web service interface initiating the execution of the service and the generation of at least one result;
receiving the at least one result by the service integration module via the first web service interface provided by the service;
processing the result by the service integration module, the service integration module being an event listener for a calendar event, the processing comprising extracting data required for specifying a calendar event in an electronic calendar of the calendar application from the result, the event being taken from the group consisting of singular events and recurring events, the recurring events being events with a particular recurrence pattern, the event being a data object in an electronic calendar of the calendar application; and
updating a calendar event of the electronic calendar of the calendar application, the updating comprising the execution of updating steps, the updating steps being taken from the group consisting of creating, deleting and modifying the calendar event in the electronic calendar of the calendar application by the service integration module in response to receiving the at least one result;
means for displaying the graphical user interface of the electronic calendar application and the updates introduced to the calendar application;
processing means for executing the instructions;
input means for specifying via a graphical user interface provided by the service integration module a service request to the service to be integrated in the calendar application, the input being provided by the user;
a network interface for connecting the computer system to a network.

18. The computer system according to claim 17, wherein the service integration module is in addition operable to automatically predict a required calendar event by:
analyzing events within the electronic calendar;
predicting and specifying at least one required event;
assigning the at least one predicted required event additional data required by the service for execution;
submitting a service request to the first web service interface of a remote service, the service request comprising the data of the predicted required event, the call of the first web service interface initiating the execution of the service and the generation of at least one result;
and wherein the service integration module is a software program being interoperable with the calendar program and being selected from the group consisting of:
a software implemented as 'plug-in' for the calendar application, and
an independent service program searching the calendar application for new calendar entries on a regular basis.

19. The computer system according to claim 17, the computer system comprising a second processing device, the second processing device having installed a groupware server of the calendar application, wherein the service integration module being installed on the second processing device and having read and write access to the data managed by the group ware server, and wherein the service integration module is a software program being interoperable with the groupware server managing the electronic calendar of at least one calendar application, the service integration module being selected from the group consisting of:
a software implemented as 'plug-in' for the group ware server of the calendar application,
an independent service program being registered as event listener with a calendar event of the group ware server of the calendar application, and an independent service program searching the events of the at least one electronic calendar managed by the groupware server of a calendar application for new calendar entries on a regular basis.

20. The computer system according to claim 17, wherein the computer system is a mobile processing device, and wherein the network interface is an interface of the mobile processing device providing ongoing or transient means to exchange data with other mobile or immobile processing devices.

* * * * *